US006965502B2

(12) United States Patent
Duffy et al.

(10) Patent No.: US 6,965,502 B2
(45) Date of Patent: Nov. 15, 2005

(54) SYSTEM, DEVICE AND METHOD FOR PROVIDING VOLTAGE REGULATION TO A MICROELECTRONIC DEVICE

(75) Inventors: Thomas P. Duffy, Chandler, AZ (US); Ryan Goodfellow, Mesa, AZ (US); Malay Trivedi, Phoenix, AZ (US); Kevin Mori, Chandler, AZ (US); Benjamim Tang, Hawthorne, CA (US)

(73) Assignee: Primarion, Inc., Phoenix, AZ (US)

( * ) Notice: Subject to any disclaimer, the term of this patent is extended or adjusted under 35 U.S.C. 154(b) by 59 days.

(21) Appl. No.: 10/103,980

(22) Filed: Mar. 22, 2002

(65) Prior Publication Data

US 2002/0171985 A1 Nov. 21, 2002

Related U.S. Application Data

(60) Provisional application No. 60/300,014, filed on Jun. 21, 2001, provisional application No. 60/291,159, filed on May 15, 2001, and provisional application No. 60/277,496, filed on Mar. 21, 2001.

(51) Int. Cl.[7] .................................................. H02H 9/00

(52) U.S. Cl. .......................................... 361/18; 361/111

(58) Field of Search ............................. 361/18, 19, 21, 361/56, 58, 90, 91, 111, 91.1, 110

(56) References Cited

U.S. PATENT DOCUMENTS 4,263,565 A * 4/1981 Astle ........................... 331/15
5,629,608 A * 5/1997 Budelman ................... 323/268
5,822,166 A * 10/1998 Massie ....................... 361/111
5,838,145 A * 11/1998 Poon et al. ................. 323/266
5,987,615 A * 11/1999 Danstrom ................... 713/300
6,130,526 A * 10/2000 Yang et al. ................. 323/272
6,268,716 B1 * 7/2001 Burstein et al. ............ 323/272
6,356,063 B1 * 3/2002 Brooks ....................... 323/284
6,577,515 B2 * 6/2003 Kates .......................... 363/65

* cited by examiner

*Primary Examiner*—Stephen Jackson
*Assistant Examiner*—Danny Nguyen
(74) *Attorney, Agent, or Firm*—Theodore E. Galanthay

(57) ABSTRACT

The present invention provides a power regulation system and method with high speed signal settling capabilities for providing rapid active transient response to a microelectronic device. An active transient response system includes a power supply configured to receive external and/or internal signals indicating the occurrence of transient load conditions and to respond to the transient load conditions based on one or more of these signals. The system may further include a transient suppressor configured for early detection of transients, assisting in transient suppression, and early signaling of transient activity to the power supply.

The system provides rapid recovery to steady state operation from the active transient response mode by using a digital compensator to quickly modifying the duty cycle and provide a voltage offset proportional to the transient microprocessor load step. Recovery is further improved by current rephasing techniques.

70 Claims, 13 Drawing Sheets

SYSTEM, DEVICE AND METHOD FOR PROVIDING VOLTAGE REGULATION TO A MICROELECTRONIC DEVICE

CROSS REFERENCE TO RELATED APPLICATIONS

This application includes subject matter that is related to and claims priority from the following U.S. Utility patent applications: Ser. No. 09/771,756 (filed Jan. 29, 2001 and entitled "Apparatus for Providing Regulated Power to an Integrated Circuit"), Ser. No. 09/944,417 (filed Aug. 31, 2001 and entitled "Wide Band Regulator with Fast Transient Suppression Circuitry"), Ser. No. 09/945,187 (filed Aug. 31, 2001 and entitled "Apparatus and System for Providing Transient Suppression Power Regulation"), Ser. No. 09/975, 195 (filed Oct. 10, 2001 and entitled "System and Method for Highly Phased Power Regulation"), Ser. No. 09/978,296 (filed Oct. 15, 2001 and entitled "System and Method for Current Sensing"), Ser. No. 09/978,125 (filed Oct. 15, 2001 and entitled "System and Method for Detection of Zero Current Condition"), and Ser. No. 09/978,294 (filed Oct. 15, 2001 and entitled "System and Method for Highly Phased Power Regulation Using Adaptive Compensation Control"). In addition, this application includes subject matter that is related to and claims priority from the following U.S. provisional patent applications: Ser. No. 60/277,496 (filed Mar. 21, 2001 and entitled "Dual Loop Control Regulator Using a Non-Linear Wide Band Loop"), Ser. No. 60/291,159 (filed May 15, 2001 and entitled "Method and Apparatus for Providing Adaptive Broadband Regulated Power to a Micro Electronic Device"), and Ser. No. 60/300,014 (filed Jun. 21, 2001 and entitled "System and Method for Wide Band Regulation of Dynamic Loads Using Distributed Transient Suppression").

FIELD OF INVENTION

The present invention relates generally to power regulation systems and, in particular, to power regulation systems, devices, and methods suitable for providing regulated power to microelectronic devices.

BACKGROUND OF THE INVENTION

Power supplies for microelectronic devices typically provide regulated power to electrical loads. For example, and with reference to FIG. 1, a typical power supply 10 provides power to load 30 over conducting path 20. Power supplies often include a voltage regulator module or switching power converter ("SPC"). SPC's are commonly used to regulate the input voltage to an electrical load. A well regulated voltage level is very important in devices such as microprocessors, microcontrollers, memory devices, and the like.

Typical microprocessors require stable, low voltage and high current power. For example, emerging microprocessors often run on less than 2 volts and more than 50 amperes. SPC's often utilize step-down Buck converters to meet the low voltage/high current requirements of microprocessors. With reference now to FIG. 2, in a typical step-down Buck converter, a control IC 210 directs the switching of power to an inductor 270 in series with the electrical load 230 and a capacitor 224 in parallel with the electrical load 230. Control IC 210 directs the switching such that a relatively steady voltage level is provided across the load 230. Furthermore, some voltage regulation modules have the ability to selectively vary the steady state voltage level provided to load 230. In this case, the load voltage level and current level are sensed and fed back to control circuit 210 over feedback lines 226 and control circuit 210 adjusts the switching rate of switch 220 to maintain a relatively steady voltage level at the level provided by an input voltage reference signal on voltage reference line 205. The steady state voltage output has a small ripple, fluctuating slightly above and below the steady state voltage value.

As the speed and integration of microprocessors increase, the demands on the power regulation system increases. In particular, as gate counts increase, the power regulation current demand increases, the operating voltage decreases and transient events (e.g., relatively large voltage spikes or droops at the load) typically increase in both magnitude and frequency.

With prior art power regulation systems, a transient current immediately causes the voltage level across the load to change. The control IC eventually compensates for the change in current and returns the load voltage to its proper value, but a droop or spike is observed in the voltage immediately after the load transient. Such a droop or spike is problematic because it may cause the device to lock up or otherwise fail.

FIG. 3 illustrates a typical load voltage regulated using system 200. Voltages across load 230 typically exhibit a voltage ripple 310 during non-transient operating conditions. A transient occurs at time 312 or 322 causing the voltage level to immediately change. This first droop 314 or spike 324 occurs because of the load package parasitics, and may appear for about 10 nanoseconds. The second droop 315 or spike 325 occurs due to board paracitics and typically appears about 150 nanoseconds from the end of the first droop/spike. A third droop 316 or spike 326 appears as a result of the control IC response time.

SPC's are generally configured to eliminate or reduce the magnitude of the third droop/spike by using Active Voltage Positioning (AVP). AVP involves providing an offset to the reference voltage by an amount proportional to the sensed load current, thereby ideally allowing the loop to settle at the peak of the third droop/spike, e.g., 330 or 340. Often, AVP is unable to overcome the third droop/spike entirely due to the magnitude of the current change.

Prior art SPC's have sometimes been able to eliminate or reduce the third droop because the load transitions of the past have been slower. However, as the microprocessor clock speed increases and the board area available for bulk capacitors decreases, the second and third droops are becoming more prominent and the prior art SPC's are less able to compensate for such droops. Various attempts have been made to create systems capable of responding more rapidly to the transients and to eliminate the first, second and third droops/spikes. These attempts have generally not been successful. Inherent delays in detection of the transient and transmission of the detection signal to the control IC are typically too large to address first and second droops/spikes. Furthermore, some existing transient response techniques have been unsuccessful at effectively containing the transient spike/droop and implementing recovery from the transient response mode to the steady state, closed loop operation mode. In extreme cases, not only is transition to the steady state voltage level delayed, but the control IC may fail to regain steady state control of the Buck converter operation. In addition, transient response techniques often run the risk of large heat generation which could result in destruction of the voltage regulator.

Accordingly, an improved power regulation system is needed. In particular, a system including a rapid transient response regulator is desired. More particularly, it is desirable to provide a power regulation system capable of detecting, responding to and recovering from transients to address first, second, and third droops/spikes.

SUMMARY OF THE INVENTION

The present invention overcomes the problems outlined above and provides an improved power regulation system, device and method. In particular, the present invention provides a power regulation system and device with high speed signal settling capabilities. In accordance with one aspect of the present invention, the system and method of the present invention provide rapid active transient response to first, second and third droops and spikes.

In accordance with an exemplary embodiment of the present invention, an active transient response system includes a power supply configured to provide power to a variable load. The power supply is configured to provide steady low voltage high current regulation. In another exemplary embodiment of the present invention, the power supply is configured to receive external signals indicating the occurrence of transient load conditions and to respond to the transient load conditions based on this external signal. In accordance with another exemplary embodiment of the invention, the power supply is configured to detect transient load conditions and to respond to the transient load conditions. The power supply includes a control integrated circuit ("IC") configured to receive signals indicating transient activity and to drive at least one power IC to quickly respond to transient activity. In accordance with various exemplary embodiments of the invention, the active transient response system includes a transient suppressor portion configured for early detection of transients, assisting in transient suppression, and/or early signaling of transient activity to the power supply.

In accordance with another aspect of the present invention, a voltage regulation method is provided for rapidly responding to load transients. In an exemplary embodiment of the present invention, the voltage regulation method includes the step of performing nominal operating mode voltage regulation. In other exemplary steps, a transient suppressor portion rapidly detects transients in current demand. The transient suppressor portion responds to the transient activity and/or directly signals a control IC to initiate active transient response to the load. In yet another step, the control IC drives at least one power IC to initiate transient response steps in a power IC module.

In further exemplary embodiments of the present invention, transient activity is detected by the power IC. In accordance with various exemplary embodiments of the present invention control of the transient response is handed off from the transient suppressor to the power IC transient detection signals. In another step, the control IC module drives recovery from the active transient response mode.

In accordance with another aspect of the present invention, a power regulation system of the present invention provides rapid signal settling and rapid recovery to steady operation of the system subsequent to the system responding to a transient event. In accordance with one exemplary embodiment of the present invention, the power IC is configured with a digital compensator to quickly modify the duty cycle of the regulator for rapid settling of an output signal. In one exemplary embodiment of the present invention, the duty cycle is modified by an amount proportional to the change of the microprocessor load step. In another exemplary embodiment of the present invention, the duty cycle change is based on the density of transient detection signals, e.g., the number of transient detection signals per unit of time. In yet another exemplary embodiment of the present invention, the power regulator is configured to provide a duty cycle step in response to a detected transient event. In yet a further exemplary embodiment of the present invention, a current rephasing technique is used to recover from a transient event and to synchronize the phased power supply output signals.

In accordance with yet another aspect of the present invention, the control IC, power IC, micro-processor, and associated circuitry are protected from shorts, over-current and other faults. In an exemplary embodiment of the present invention, the protection devices include current limit circuits, transient response number limiting circuits, thermo-limit circuits, and/or other fault detection circuits.

BRIEF DESCRIPTION OF THE DRAWINGS

These and other features, aspects and advantages of the present invention will become better understood with reference to the following description, appended claims, and accompanying drawings where:

DETAILED DESCRIPTION

The present invention relates to an improved power regulation system or power conversion system suitable for providing regulated power to a microelectronic device.

Although the power converter disclosed herein may be conveniently described with reference to a single or multiphase buck converter system, it should be appreciated and understood by one skilled in the art that any switching power converter or regulator topology may be employed, e.g., buck, boost, buck-boost, flyback, or the like. Further, although the power regulator, system, and method of the present invention may be used to supply power to any microelectronic device, the invention is conveniently described herein with reference to supplying power to a microprocessor.

As discussed above, efforts by others have generally failed to develop a SPC capable of addressing first, and to some extent second and third droops and spikes which result from transient load activity. The present invention overcomes the problems outlined above and provides an improved power regulation system and method. In particular, the present invention provides a power regulation system with high speed signal settling capabilities. More particularly, the system and method of the present invention provide rapid active transient response to first, second and third droops/spikes and provide an improved recovery to steady state operation.

In accordance with an exemplary embodiment of the present invention, a power supply is configured to receive early transient event detection signals, respond to the transient events, and recover from the response mode to a quiescent voltage regulation mode. A number of detection, response, recovery and protection systems may be utilized in connection with this voltage regulation device.

Figure 1:
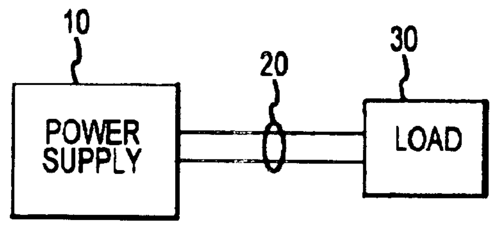
FIGS. 1 and 2 illustrate, in block format, a typical power regulation system.
Figure 2:
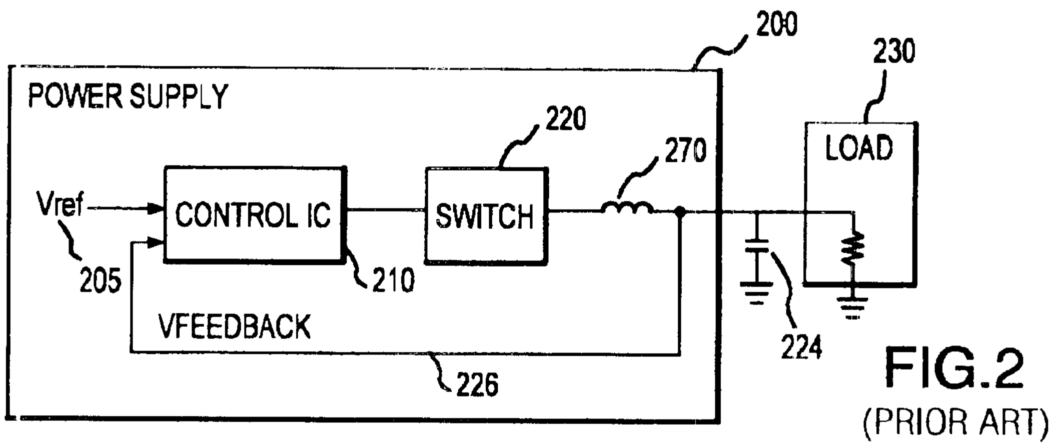
Figure 3:
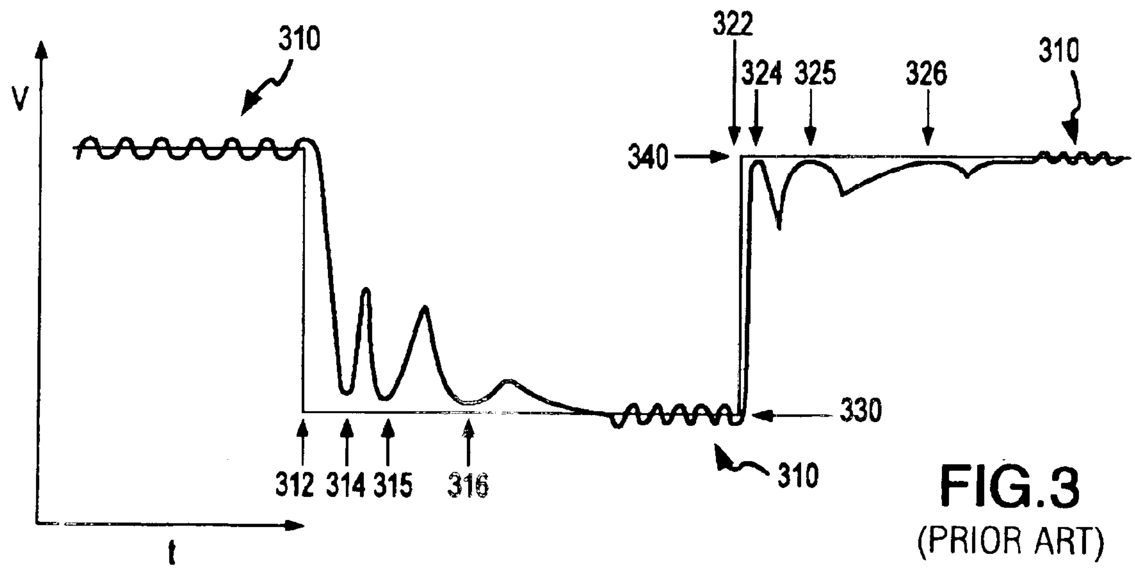
FIG. 3 illustrates a graph voltage vs. time for a transient event.
Figure 4:
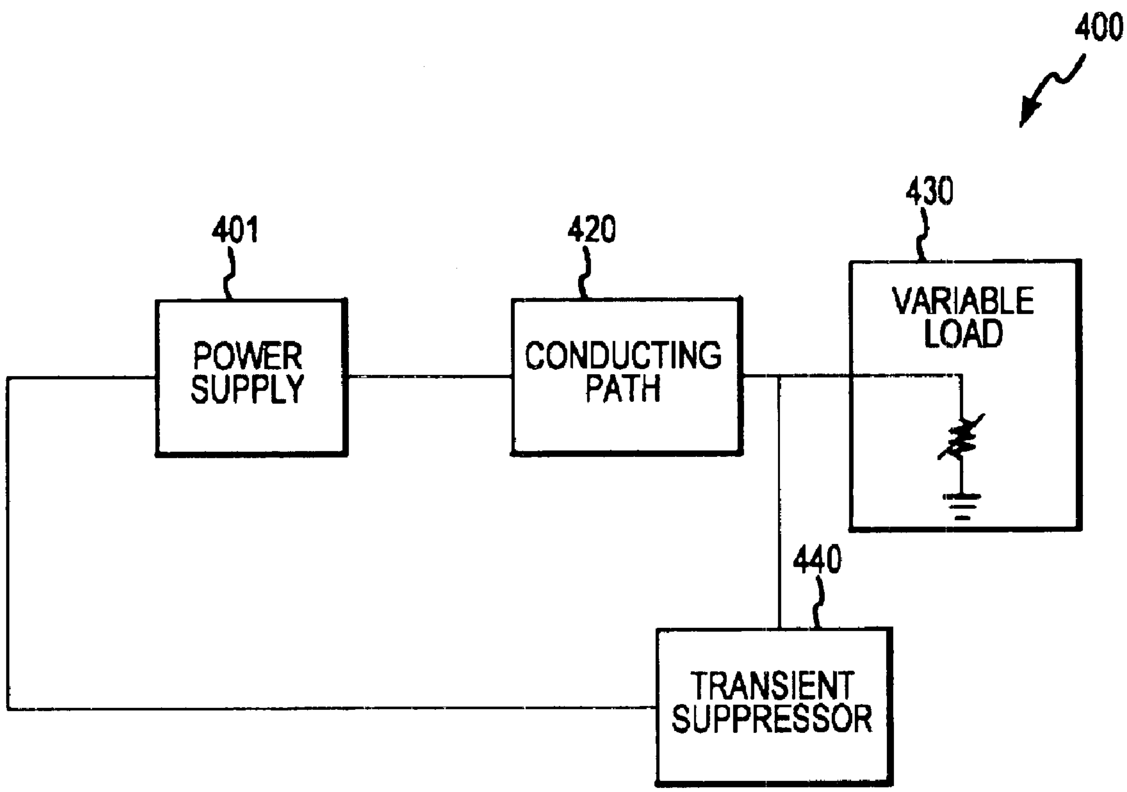
FIGS. 4 and 5 illustrate, in block format, an exemplary active transient response system for use in an exemplary embodiment of a power regulation system of the present invention.

With reference now to FIG. 4, and in accordance with an exemplary embodiment of the present invention, an active transient response ("ATR") system 400 includes a power supply 401 configured to provide power to a variable load 430 through a conducting path 420. Power supply 401 is configured to provide steady, low voltage and high current regulation during a quiescent voltage regulation mode. Power supply 401 is also configured to respond to transient load conditions to maintain a steady voltage level at load 430. To this end, and in accordance with various embodiments of the invention, power supply 401 is configured to internally detect transient load conditions and to respond to the transients based on internal feedback. In accordance with other exemplary embodiments of the present invention, power supply 401 is configured to receive external signals indicating the occurrence of transient load conditions and to respond to the transients based on this external signal. Power supply 401 may be further configured to initially base the transient response on the external transient detection signals and then to transition to the internal signals.

Power supply 401, in accordance with exemplary embodiments of the invention, is configured to use active transient response techniques and/or zero current detect ("ZCD") techniques to rapidly respond to the transients. In addition, power supply 401 is configured to recover from the active transient response techniques to a quiescent voltage regulation mode. Power supply 401 may also be configured to provide protection against over currents, excessive active transient response activity, and faults.

As discussed in greater detail below, supply 401 may be configured in a variety of ways in accordance with the invention. The configuration of power supply 401 may depend on such factors as the type of load 430, type of transient suppressor 440, and the like. In accordance with one embodiment of the present invention, supply 401 is a multi-phase switching regulator as described herein. In other exemplary embodiments, power supply 401 may include a single switching regulator, an array of single switching regulators, an array of single or multi-phase switching regulators, or the like. In accordance an exemplary embodiment of the present invention, power supply 401 is a switching power converter ("SPC") in a buck topology, however, other power supply topologies may also be used in active transient response system 400.

Conducting path 420 is configured to receive and transmit, with or without processing, the power signal provided by power supply 401 to variable load 430. Conducting path 420 includes a transmission path, e.g., a conductive traces, between power supply 401 and load 430. For example, conducting path 420 may include portions of a printed circuit board, a back plane, a motherboard, or other type of conducting path.

In an exemplary embodiment of the present invention, active transient response system 400 also includes a transient suppressor 440 configured to respond to and regulate transient load demands. In other words, transient suppressor 440 may be configured to sink and/or source current to variable load 430 to rapidly address changing load demands. In general, transient suppressor 440 includes current sink and/or current source elements to respond to transient events. Transient suppressor 440 may also include detection and signaling elements to detect transient events and to transmit appropriate signals to the sink/source elements.

In accordance with another exemplary embodiment of the present invention, transient suppressor 440 may also include detection and signaling elements to detect transient events and to transmit appropriate signals to power supply 401 to provide early transient detection to power supply 401. Although in one exemplary embodiment, transient suppressor 440 is the source of the external transient detection signals, other devices may suitably provide external transient detection signals to power supply 401.

In general, variable load 430 includes any microelectronic circuit which may benefit from a regulated voltage level. For example, variable load 430 may include a microprocessor. In other exemplary embodiments of the present invention, variable load 430 includes a microcontroller, memory device, or other electronic device. In various embodiments of the present invention, variable load 430 may include some or all of the components discussed with reference to FIG. 4. For example, variable load 430 may include transient suppressor 440 and/or portions of power supply 401. So configured, a variable load, e.g., a microprocessor, may self regulate its own power supply or include "on-board" transient suppression devices. For example, a microprocessor may be both the variable load 430 and the source of external transient detection signals to power supply 401.

In accordance with various aspects of the present invention, active transient response system 400, is configured to reduce the magnitude of first, second and third droops and/or spikes. The first droop/spike may occur within 10 nanoseconds of the start of the transient event. The second droop/spike may occur about 150 nanoseconds from the end of the first droop/spike. The third droop/spike may appear, for example, within 5 micro seconds of the start of the transient event. In accordance with various exemplary embodiments of the present invention, although the timing of the droop/spike events may vary from the exemplary times stated above, active transient response system 400 is configured to reduce the magnitude of these spikes.

Figure 5:
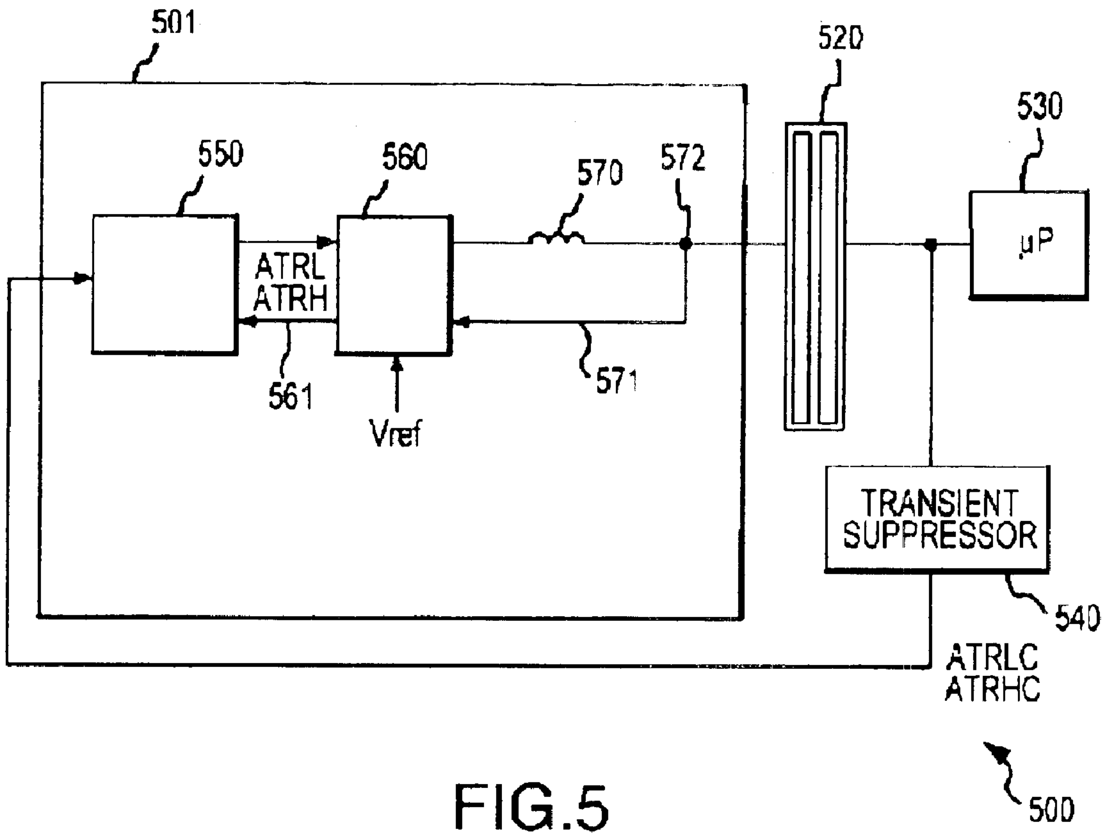

FIG. 5 illustrates an active transient response system 500, in accordance with one exemplary embodiment of the present invention, which includes a switching power converter 501, a microprocessor 530, and a motherboard 520, which may be configured as discussed above with reference to FIG. 4. In this exemplary embodiment, SPC 501 includes a control IC 550, a power IC 560 and an inductor 570. Control IC 550 is configured to drive power IC 560 and to receive signals indicating transient activity. As discussed above, in accordance with various exemplary embodiments of the present invention, the transient activity detection signals can be received from transient suppressor 540, from power IC 560, or other suitable device. Control IC 550 is further configured to drive a rapid transient response based on the transient activity detection signals. Furthermore, in the event that control IC 550 is provided with transient detection signals from both transient suppressor 540 and power IC 560, control IC 550 may be further configured to transition control of the transient response from the transient suppressor 540 transient activity detection signal to the power IC transient activity detection signal.

In an exemplary embodiment of the present invention, transient suppressor 540 is located in relatively close proximity to microprocessor 530, and may be packaged with the variable load, to facilitate early detection and/or rapid response to transient events. However, in other exemplary embodiments, transient suppressor 540 may be physically located in SPC 501 or may be integrated into microprocessor 530. Furthermore, although transient suppressor 540 is illustrated as a single device, transient suppressor 540 may suitably include an array of identical transient suppressor circuits. In other exemplary embodiments, the transient suppressor circuits in the array may be individually configured as needed, and for example, one transient suppressor may operate to perform detection steps for the entire array. Furthermore, each transient suppressor 540 may include a plurality of transient suppressor devices configured, for example, such that a first transient suppressor performs the detection and/or signaling tasks, and a second transient suppressor performs the response tasks. In any of these exemplary embodiments, the transient suppressor devices may suitably be configured in a single integrated device or in multiple devices.

Power IC 560 is configured to provide steady, low voltage high current power at the power supply output 572 via inductor 570. SPC 501 is further configured with a feedback path 571 for sensing the power supply output voltage level and/or current level and providing the same to power IC 560. Power IC 560 is configured to receive feedback path 571 and to determine the existence of transient activity. Transient activity may include any deviation, that exceeds a deviation threshold, in the current and/or voltage demands of the load (e.g., greater than 3% of the operating voltage or less than 3% of the operating voltage). In one exemplary embodiment of ATR system 500, current and/or voltage sensors generate feedback signal(s) provided on feedback path 571. These sensors may either be located internally or externally to power IC 560. Furthermore, these sensors may provide feedback signals either to power IC 560 or control IC 550. Power IC 560 is further configured to provide "active transient response high" ("ATRH") and "active transient response low" ("ATRL") transient detection signals, over ATRH/ATRL signal lines 561, to control IC 550, indicating that transient activity has been detected within SPC 501. Furthermore, other methods of detecting transient events internally to SPC 501 and signaling control IC 550 may be used in various embodiments of the present invention. In accordance with an exemplary embodiment of the present invention, power IC 560 is further configured to use ZCD techniques to respond to transients.

Although power IC 560 is illustrated as a single device, power IC 560 may suitably include an array of identical power IC circuits. In other exemplary embodiments, the power IC circuits in the array may be individually configured as needed, and for example, one power IC may operate to perform detection steps for the entire array. Furthermore, each power IC 560 may include two separate power IC devices where the first device provides quiescent mode voltage regulation and the second device provides transient response mode voltage regulation. In any of these exemplary embodiments, the power IC devices may suitably be configured in a single integrated device or in multiple devices and to operate in parallel with each other.

Control IC 550 is configured to control power IC 560. Control IC 550 may be further configured to use active transient response techniques to respond to transients. In addition, control IC 550 may include a compensator configured to recover from the active transient response techniques. Power IC 560 and control IC 550 may also be configured to provide protection against over-currents, excessive active transient response activity, and faults.

Information relating to input/output characteristics of the power regulation system may be transmitted from various system elements to control IC 550 in a suitable feedback loop. For example, control IC 550 preferably receives digital information regarding mode of operation, output voltage, and output current from each power IC 560. In turn, control IC 550 sends switch state information, such as pulse width and frequency information, to each power IC 560 to, for example, compensate for the demands of the load, the voltage source, and any environmental changes in order to maintain a constant voltage to the load. In this sense, control IC 550 may include a digital signal processor (DSP), a microcontroller or any suitable processing means.

For example, control IC 550 may include one or more algorithms to facilitate control of the system. As previously mentioned, power ICs 560 are suitably configured to transmit input/output information to control IC 550 and the algorithms are suitably adaptive to the received information. In other words, control IC 550 may modify the control algorithms in response to the received information. Because the control function may be saved or programmed in an algorithm, software code, memory location or the like, modes of operation can be changed continuously during the operation of the system as needed, e.g., to obtain an improved transient response. In this manner, control IC 550 may be programmed with recovery algorithms to effectively respond to sensed transient conditions at the regulated output 572.

These recovery or response techniques may be used to rapidly increase or decrease current supply from power IC 560 to load 530 for regulating the voltage supplied to the load during transient events. For example, in ATRH and ATRL modes, control IC 550 includes instruction to align the high-side or low-side FETs on. This action provides a brief period of high di/dt through the power IC in order to respond to high di/dt load demands (e.g., a microprocessor load). Each power IC 560 is suitably configured to operate in any suitable control mode such as, Pulse Width Modulation (PWM), constant ON time variable frequency, constant ON or OFF time and variable frequency, simultaneous phases ON, and simultaneous phases OFF. In one particular embodiment, control IC 550 includes one or more algorithms for providing predictive control of the particular system. For example, a suitable algorithm may be programmed to recognize signs or receive signals indicating a high load, current, or similar situation. The control IC may then be able to set the power regulation system to an operational mode best suited for the anticipated condition.

Motherboard 520 is configured to receive and transmit, with or without processing, the power signal that SPC 501 provides to variable load microprocessor 530. Therefore, motherboard 520, in various exemplary embodiments of the present invention, may be coupled to transient suppressor 540, microprocessor 530, and/or power IC 560 and other devices within SPC 501. In an exemplary embodiment of the present invention, active transient response system 500 may include a transient suppressor 540 configured, as described with reference to FIG. 4, for early detection of transients, assisting in transient suppression, and/or early signaling of transient activity to power supply 501.

In an exemplary embodiment of the present invention, transient suppressor 540 is configured to operate at Giga-Hertz operating speeds, and power IC 560 is configured to operate at Mega-Hertz operation speeds. However, in other embodiments of the present invention, other speeds may be suitably incorporated to respond to transient events.

Figure 6:
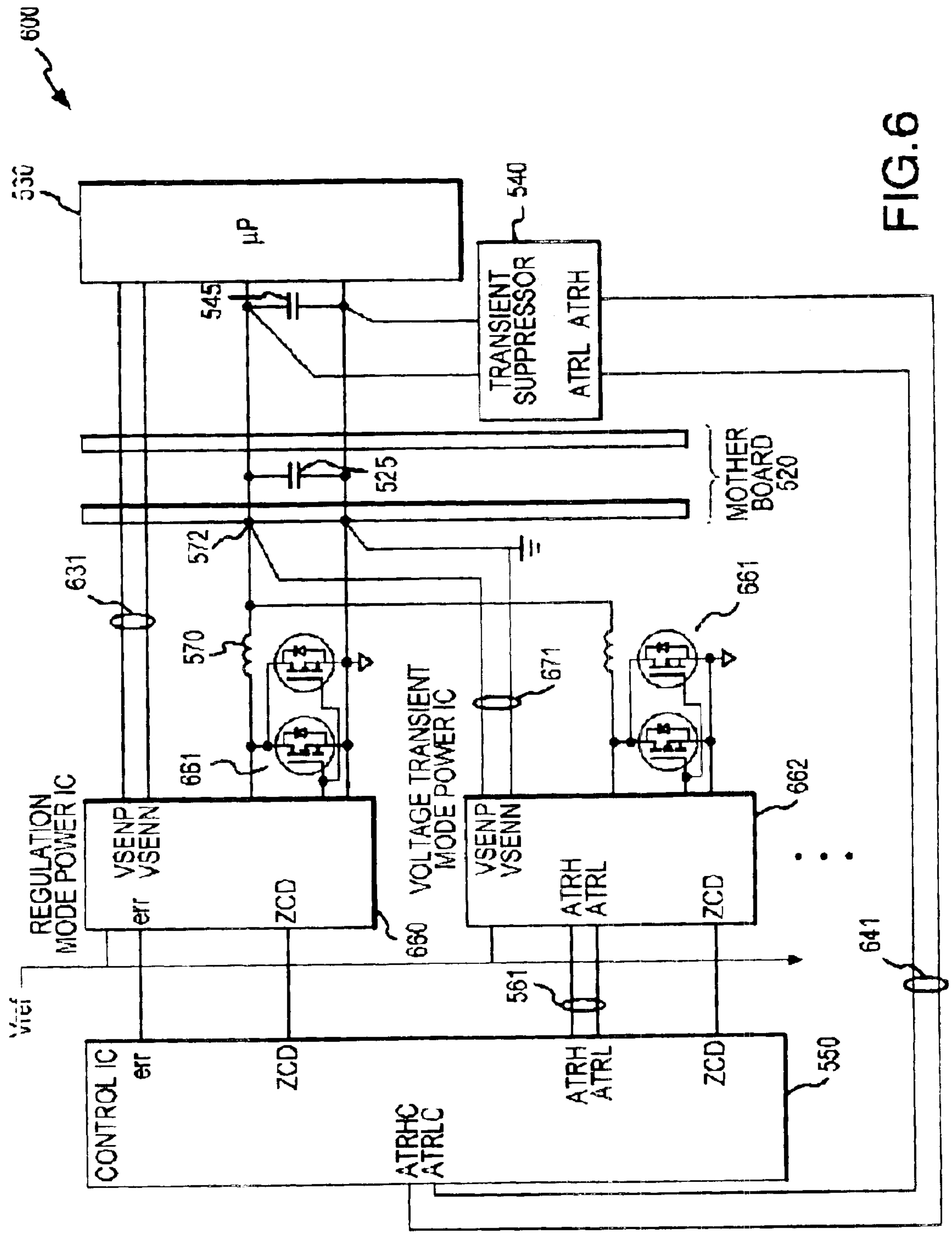
FIG. 6 illustrates, in schematic format, an exemplary active transient response system for use in an exemplary embodiment of a power regulation system of the present invention.

In a more detailed view, FIG. 6 illustrates a schematic drawing of an exemplary embodiment of the present invention. As many of the sub-components of active transient response system 600 have already been described, similarly identified devices in FIG. 6 will not be further described in connection with FIG. 6.

As discussed above, the functions of power IC 560 may be performed, in one exemplary embodiment, by two or more power IC circuits. The multiple power IC circuits can be configured to perform different tasks. For example, some power IC circuits may be configured to sense transient activity or to receive signals from sensors indicating the presence or absence of transient activity. Moreover, these sensors may take their readings from many different places. Furthermore, all the power IC circuits can be configured to respond to detected transients. In an exemplary embodiment of the present invention, first power IC circuit 660 is a regulation mode power IC circuit configured to maintain the voltage regulation during periods without transient activity. Second power IC 662, in contrast, is a voltage transient mode power IC configured to sense transients. In other exemplary embodiments of the present invention, a single power IC may perform both functions. A single output phase is generated with either the single power IC or with the dual power IC circuits.

Additional power IC circuits or pairs of power IC circuits may be combined in parallel with first and second power IC circuits 660 and 662 to form additional power supply output phases. For example, 8 power IC circuits may be combined in parallel to form an 8 channel or 8 phase voltage regulator. Control IC 550 may be configured to independently control each power IC to perform voltage regulation. For sake of clarity, when a general power IC circuit is described herein, reference is made to power IC 560 with the understanding that the power IC may be configured as power IC's 660 and 662 and as multiple power IC channels, or the like.

Furthermore, ATR system 600 may include a plurality of power ICs and multiple loads. For example, first and second power ICs may be coupled to a first load and third and fourth power IC's may be coupled to a second load. Control IC 550 may be configured to independently manage the voltage regulation to these multiple loads. It should be appreciated that any number of power ICs may be coupled together to provide regulated voltage to one or more loads or one or more portions of a single load.

In some embodiments of the power IC's, the low-side switch may be internal to the IC. However, in this exemplary embodiment, the low-side switch 661 is external of the power IC. Generally, power ICs may be configured to alternately couple inductors 570 between the source voltage and a ground potential based on control signals generated by control IC 550. During transient load events, any number of output inductors 570 may be coupled simultaneously to either the voltage source or ground potential as needed by the load(s). In addition, the inductance of inductor 570 can vary depending upon input and output requirements. Capacitance 545 provides DC filtering of inductor currents and further acts as a charge well during load transient events.

In some embodiments, regulation mode power IC 660 receives voltage level feedback via Vsense signal lines 671. Power IC 660 may be configured to sense voltage levels at the power regulator input to motherboard 520. Furthermore, microprocessor 530 may internally sense and report on the voltage regulation and provide this information over voltage feedback lines 631. ATR system 600 further includes one or more capacitors, e.g., 545 and 525, in parallel with the microprocessor load 530. For example, load capacitor 545 may be located in relative proximity to microprocessor 530, and motherboard capacitor 525 represents system capacitance internal to motherboard 520. The capacitors provide output filtering, among other things.

That being said, the active transient response systems 400, 500, and 600 perform quiescent voltage regulation while monitoring for load transients. A transient condition may arise if, for example, microprocessor 530 begins to use an increased amount of current. In this event, the voltage level across load 530 immediately droops. In accordance with an exemplary embodiment of the present invention, the existence of transient activity is generally first detected by transient suppressor 540 and later detected by a power IC 662, although both monitor for transient activity at the same time. In this exemplary embodiment, early detection of transient activity by transient suppressor 540 is facilitated, for example, by the proximity of the detection device to the load. Transient suppressor 540 is configured to respond to the transient activity by immediately sourcing or sinking current directly to the load. For example, if the voltage level began to drop, transient suppressor 540 would add current to the load to reduce the voltage drop. The current may be sourced in a high frequency stream of narrow pulses of charge injection. The direct sourcing or sinking of current to the load is a temporary activity. For example, the current source/sink device may continue to provide current until the transient suppressor window comparator, discussed in detail below, no longer generates ATR signals. In another embodiment, the current source/sink device may provide current for a fixed or programmed period of time.

In accordance with another exemplary embodiment of the present invention, upon detection of transient activity, transient suppressor 540 generates ATR signal(s) and transmits the ATR signal(s) directly to control IC 550 via ATRHC/ATRLC signal lines 641. The ATR signal, in one embodiment includes an ATR high ("ATRHC") signal representing a voltage decrease, and an ATR low ("ATRLC") signal representing a voltage increase. The ATRHC and ATRLC signals provide early notification to control IC 550 that transient activity is taking place and thus control IC 550 is able to implement an early response to the transient activity.

In response to the transient detection signals, control IC 550 implements an early active transient response. More particularly, control IC 550 drives power IC 662 to initiate transient response steps. These transient response steps are discussed in further detail below.

As mentioned above, in one exemplary embodiment of the present invention, power IC 662 generally detects transient activity later than transient suppressor 540. Therefore, by the time power IC 662 detects the transient activity, power IC 662 is generally already being driven by control IC 550 to respond to the transient. Nevertheless, after power IC 662 detects the transient activity, power IC 662 generates and transmits to control IC 550 its own ATRH and ATRL signals. Until this point, control IC 550 has been driving a power IC response to the transient based on ATRLC/ATRHC signals from transient suppressor 540. However, in accordance with an exemplary embodiment of the present invention, control IC 550 further includes gating logic which determines an appropriate point in time for control IC 550 to handoff the transient suppressor ATRLC/ATRHC signals to the power IC ATRL/ATRH signals. Then, control IC 550 continues to drive the power IC to respond to the transient based on the power IC ATRL/ATRH signals. After the power IC response to the transient, control IC 550 drives recovery from the active transient response mode.

As discussed above, an abrupt change in load current causes an abrupt deviation in the output voltage from the voltage set point. Conventional quiescent voltage regulation may eventually return the voltage to the desired set point, but typically 3 or more spikes/droops result from the transient activity. A SPC, in one exemplary embodiment of the present invention, is configured to reduce the third spike/droop by providing an active voltage positioning feature. This feature provides an offset to the reference point by an amount proportional to the sensed load current step and thereby causes the loop to settle at approximately the peak of the third spike/droop. The actual load voltage set point remains at the original level because the voltage level provided by the SPC is offset by an additional amount proportional to sensed load current.

In one exemplary aspect of the present invention, during non-transient regulation mode operation, voltage and/or current are sensed to provide feedback on the voltage regulation process. Sensors may be physically located inside or outside of power IC 660. For example, power IC output voltage level is communicated from a voltage sensor external of power IC 660 to power IC VSENSE input ports via feedback lines 671. Each power IC 660 has a voltage and/or current analog-to-digital converter ("ADC") that converts the analog signals, such as the analog VSENSE signal, from the voltage sensor and/or current sensor to their digital equivalent representations. Power IC 660 may be configured to derive a voltage error signal and provide the voltage error signal to Control IC 550. Power IC 660 may also provide to control IC 550 a digital representation of the load current. Power IC 660 may also be configured to drive control signals to the semiconductor power switches in power IC 660 to regulate the voltage.

Figure 7:
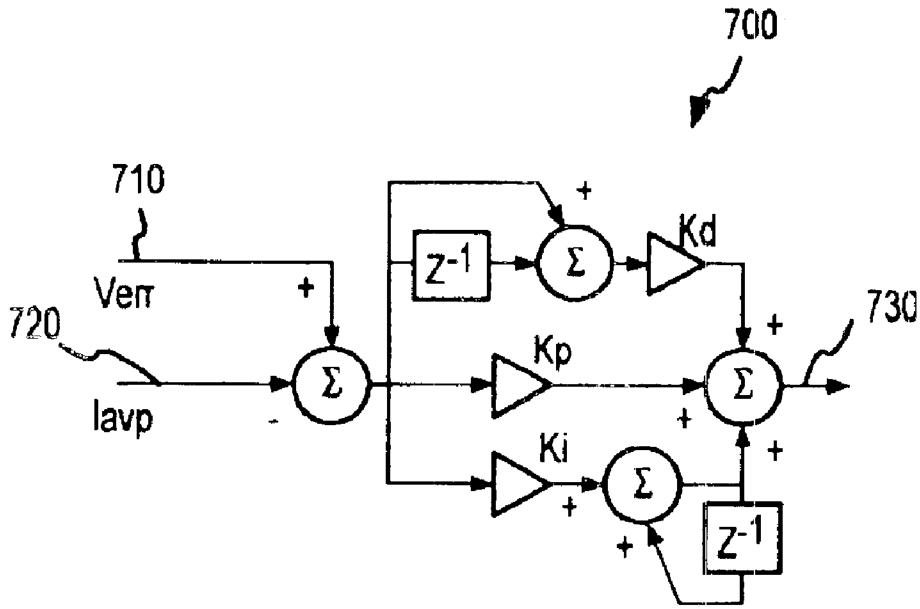
FIGS. 7 and 8 illustrate, in block format, exemplary digital compensators for use in power regulation systems of the present invention.
Figure 8:
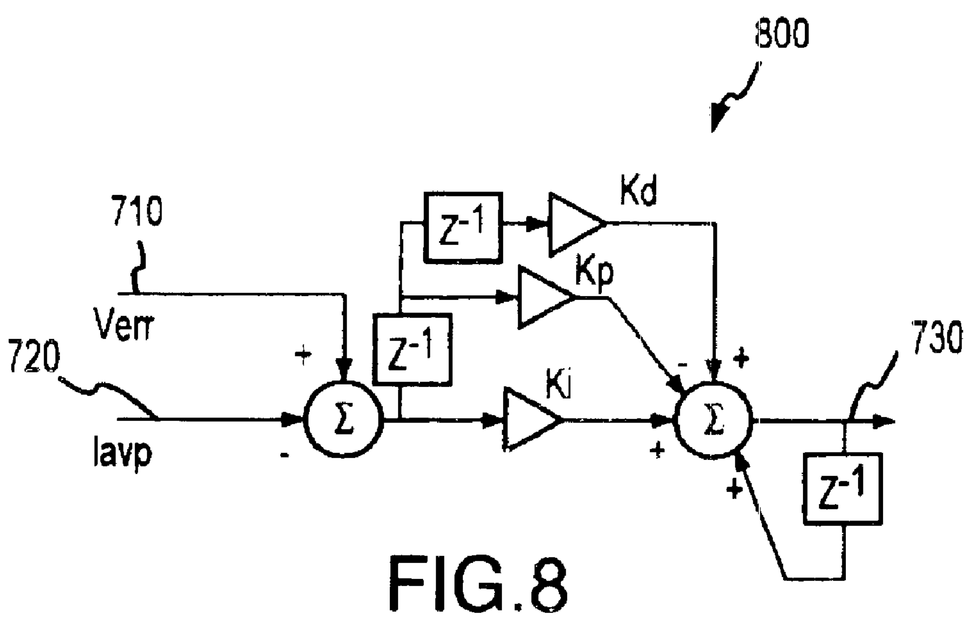

Control IC 550 may be suitably configured to receive the ATR signals from a window comparator and either alone or in combination with the digital voltage and current information received, the control IC may adjust the load voltage, set voltage, or manipulate other system components as needed to coordinate precise control of the output voltage. In an exemplary embodiment of the present invention, control IC 550 includes a digital compensator which receives the voltage error signal Verr and the active voltage positioning current signal, lavp. The Verr signal represents the difference between the reference voltage and the sensed load voltage. The lavp signal represents the scaled load current that provides the active voltage positioning offset to the reference voltage. Two exemplary implementations of a digital compensator are shown in FIGS. 7 and 8. The digital compensator, e.g., 700 or 800, receive voltage error signals on line 710 and an active voltage positioning current signal on line 720. The compensator is configured as a digital Proportional-Integral-Derivative (PID) stage. The output of this block is proportional (with gain Kp), integral (with gain Ki) and derivative (with gain Kd) of the input difference of the Verr and lavp signals. The compensator is configured to, among other things, ensure stable operation of the SPC with a substantially small steady state ripple and fast transient response. The digital compensator generates a control signal, e.g. on line 730, for controlling the switching of power switches for responding to changes in the load. The digital compensator may, for example, utilize digital delay, gain and summing stages. These stages may provide the control operation, and thus eliminate the need for amplifiers, resistors and capacitors used in analog systems. Furthermore, a digital PID may comprise any component that is the digital equivalent of an analog transfer function or implementation used to stabilize or control a switching power supply.

Figure 9:
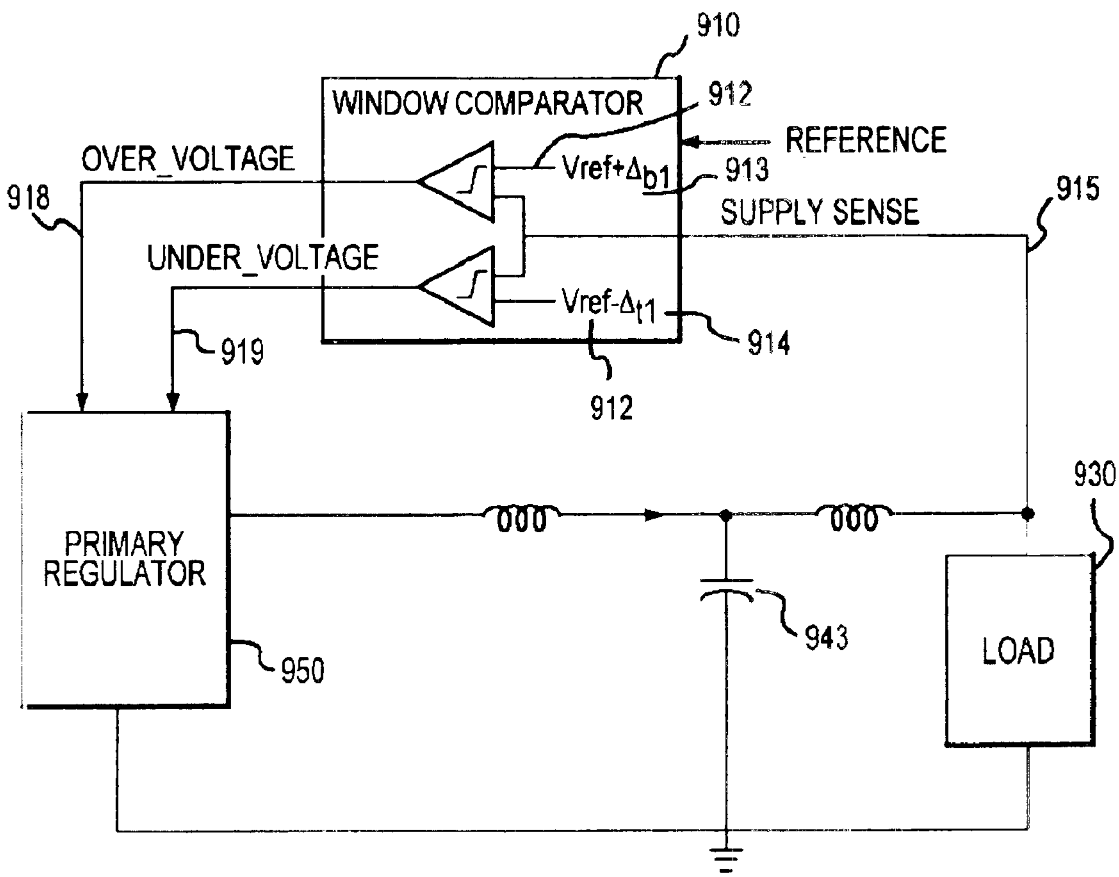
FIGS. 9 and 10 illustrate, in block format, an exemplary window comparator for use in an exemplary embodiment of a power regulation system of the present invention.

In accordance with one aspect of the present invention, transient load conditions are rapidly detected by power IC 660. For example, power IC 660 may include a window comparator configured to detect transient load events. FIG. 9 illustrates an exemplary window comparator system 900 which includes a window comparator 910 configured to receive a differential sensed voltage on line 915 representing the voltage across variable microprocessor load 930. In an exemplary embodiment, the voltage signal on a line may be filtered before the window comparator to remove noise. Window comparator 910 is further configured to receive a reference voltage on line 912 and to compare the reference voltage on line 912 with the voltage on line 915 across the microprocessor load. Window comparator 910 is further configured to generate an ATRH signal if the sensed voltage is lower than the reference voltage by a threshold level 914 and to generate an ATRL signal if the sensed voltage is higher than the reference voltage by a threshold level 913. The threshold levels may, for example, be independently set and may also be programmable and may be added to the reference voltage on line 912. In one example, a reference voltage of 1.65 Volts with a threshold voltage of 1.7 Volts may be used for ATRL. Other reference voltage and threshold voltage levels may also suitably be used in the present invention. The ATRH and ATRL signals are transmitted to control IC 950, for example, over independent signal lines 918 and 919, alerting control IC 950 to the transient activity. The reference voltage may be provided to window comparator 910 by control IC 950 and may, for example, be a fixed reference voltage. In accordance with an exemplary embodiment of the present invention, reference voltage on line 912 is chosen to be at the midpoint of the active voltage positioning window. Thus, in this embodiment, the entire window adjusts with changes generated by the AVP system.

Figure 10:
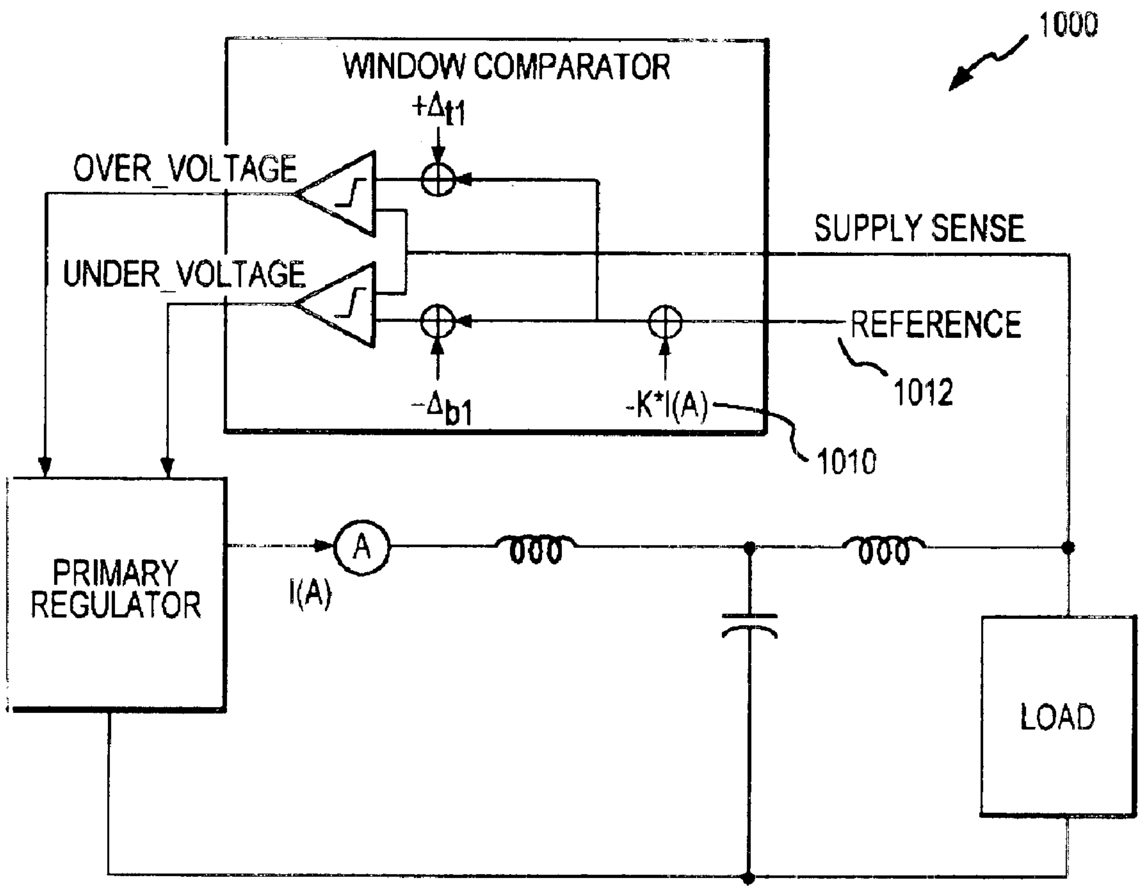

Although the window comparator described with reference to FIG. 9 is a DC reference type window comparator, other embodiments of window comparators can be utilized in accordance with various embodiments of the present invention. For example, in an AC type window comparator the reference voltage may be derived from the sensed voltage by passing the sensed differential voltage signal through a low pass filter. In another exemplary embodiment of the present invention, the sensed voltage may be offset by the AVP amount. With reference to FIG. 10, reference voltage on line 1012 may be offset by a gained sensed power IC output current signal 1010. Thus, window comparator 1000 is configured to track the AVP by decreasing the reference voltage when the current demand increases.

Although each power IC module may include a window comparator, the SPC may, for example, only use one of the window comparators in one of the multiple power IC modules to detect transients.

In another exemplary embodiment of the present invention, transient suppressor 540 includes a window comparator configured for early detection of transient activity. Transient suppressor 540 may be physically located close to the microprocessor load, and has a higher bandwidth than power IC 662. Transient suppressor 540 includes, for example, an AC-coupled window comparator, as discussed above, to detect transient events. The window comparator similarly generates ATR detection signals, ATRHC and ATRLC, which are provided to control IC 550 over dedicated signal lines 641. Furthermore, transient suppressor 540 includes a di/dt sensor configured to quickly detect load current transients.

As discussed above, the power IC may signal control IC 550 with ATRH or ATRL signals when the power IC detects transient events. Control IC processes this information, and coordinates and drives a response to the transient activity, directing the power IC circuits accordingly. Power IC 550 response may, for example, be limited by the ATR sense delay and gate drive delay. This process is generally too slow to address first and second voltage droops and spikes that typically result from transient events; therefore, the faster responding transient suppressor 540 may provide early detection signals to control IC 550. The early detection signals cause the control IC to initiate an ATR response in anticipation of the ATR signals from power IC 560. Therefore, transient suppressor detection signals ATRHC or ATRLC regulate the initial control IC 550 directed transient response.

In one exemplary embodiment of the present invention, the control IC initially accomplishes transient regulation of the power system based on the ATR signals from the transient suppressor. In this embodiment, after the ATR signals are received from power IC 662, they override the ATR signals from the transient suppressor and control IC 550 achieves regulation based on the signals from power IC 662. For example, control IC circuitry 550 may be configured to accomplish transient regulation of the power system based on the ATR signals from the transient suppressor until ATR signals are received at control IC 550 from power IC 662. In other exemplary embodiment of the present invention, the control IC may ignore ATR signals from the transient suppressor, and in yet another embodiment, the transient suppressor may not be connected to the control IC or the power IC. In these latter embodiments, the control IC addresses the transient events based on ATR signals from the power IC alone.

Figure 11:
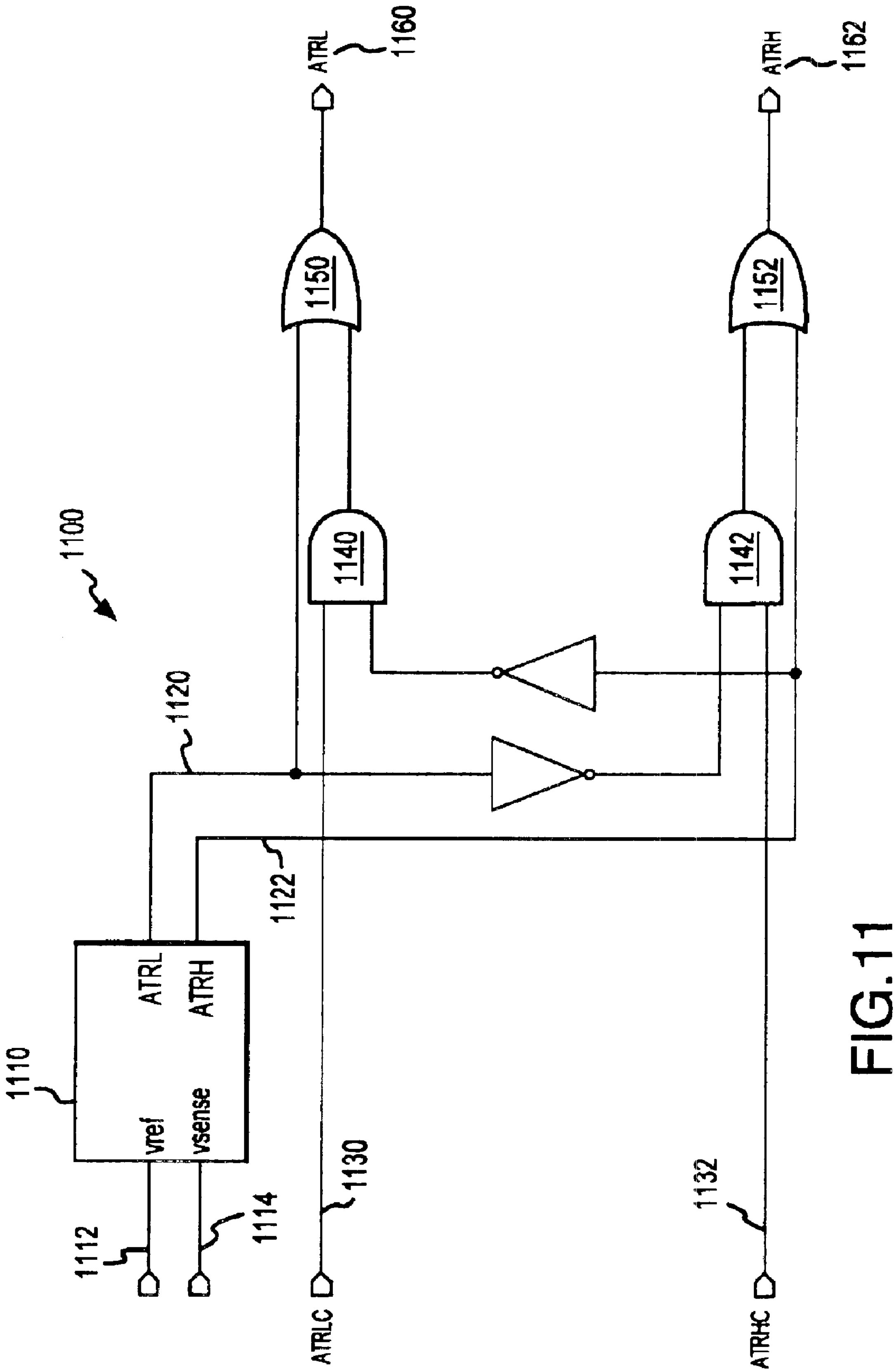
FIG. 11 illustrates, in block format, an exemplary gating logic for use in an exemplary embodiment of a power regulation system of the present invention.
Figure 14:
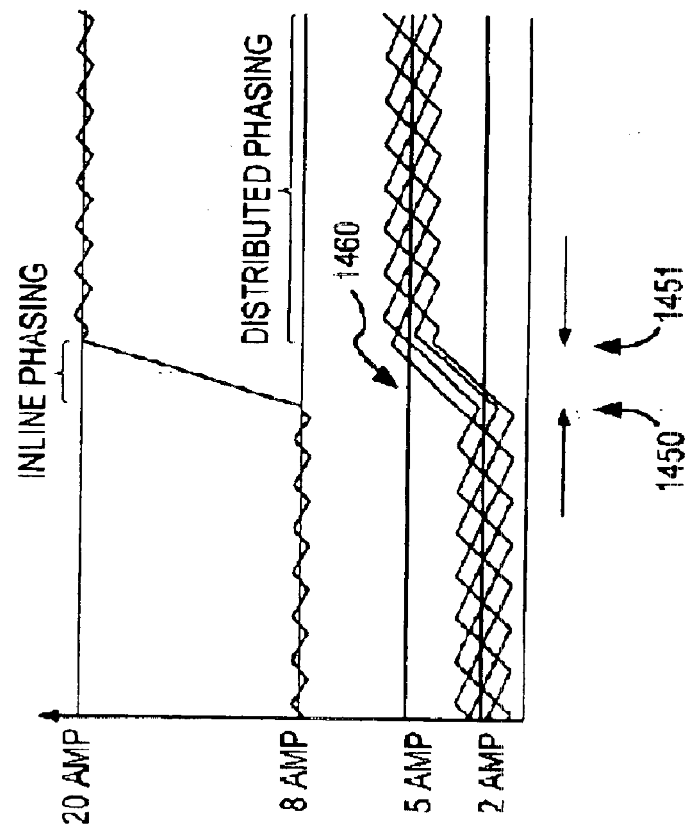
FIGS. 14 and 15 illustrate exemplary resulting output signals corresponding to the responses of the devices in FIGS. 12 and 13 in accordance with one exemplary power regulation system of the present invention.
Figure 12:
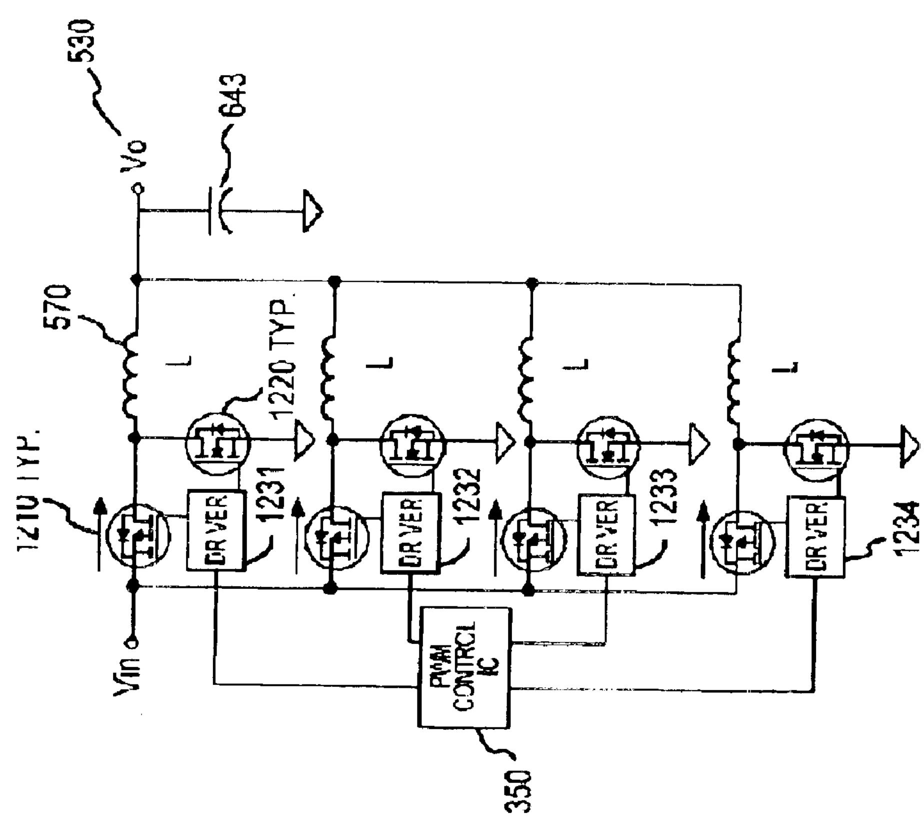
FIGS. 12 and 13 illustrate, an exemplary active transient response device in accordance with one exemplary power regulation system of the present invention.

In an exemplary embodiment, and with reference to FIG. 11, gating logic circuitry 1100 provides this transition. Gating logic circuitry 1100 includes power IC window comparator 1110 for receiving a reference voltage signal, Vref, over Vref signal line 1112 and sensed voltage signal, Vsense, over Vsense line 1114 and for providing a logic signal on ATRL signal line 1120 and ATRH signal line 1122. Gating logic circuitry 1100 further receives logic signals on ATRLC signal line 1130 and ATRHC signal line 1132.

In another exemplary embodiment of the present invention, the control IC may ignore ATR signals from the transient suppressor and regulate voltage based on the ATR signals received from the power IC. In yet another embodiment, the control IC may be configured such that it does not receive ATR signals from the transient suppressor IC and again the control IC regulates voltage based on ATR signals from the power IC.

In one exemplary embodiment of the present invention, gating logic circuitry 1100 includes an AND gate 1140 which is configured to receive the ATRLC signal on ATRLC signal line 1130 and the inverted ATRH signal from ATRH line 1122, and AND gate 1142 which is configured to receive the ATRHC signal on ATRHC signal line 1132 and the inverted ATRL signal from ATRL signal line 1120. The circuitry also includes OR gate 1150, which is configured to receive the output of AND gate 1140 and ATRL signal on line 1120, and OR gate 1152, which is configured to receive the output of AND gate 1142 and ATRH signal on line 1122. In this manner, the outputs of OR gate 1150 and 1152 generate unified ATRL and ATRH signals on ATRL and ATRH lines 1160 and 1162, respectively.

The unified outputs signals on lines 1160 and 1162 indicate whether no transients are present, for example, by both signals remaining logic low. The unified outputs also indicate whether a transient load current step down has occurred, i.e., logic high on ATRL line 1162, or whether a transient current step up has occurred, e.g., logic high on ATRH line 1160. Although one combination of logical devices has been described, other combinations may also be used which result in unified ATRL and ATRH signals where a logic high from either the power IC window comparator detection signal or from the transient suppressor detection signal is sufficient to provide an equivalent logic high on the corresponding unified detection signal.

With reference now to FIGS. 12–15, multiple power IC circuits 1231–1234 are shown configured to operate in parallel. The parallel operation of power IC circuits aids in the maintaining of low ripple voltage. Furthermore, control IC 550 may be configured to remove, in the event of failure of one of the power IC circuits, a non-functioning power IC and replacing it with another power IC. Control IC may be further configured to change the number of actively used power IC devices and to accordingly rephase the switching of the remaining power IC devices. Control IC 550 may be further configured to drive the parallel power IC devices in a manner where the switching of the devices is phased to equally spread out the supply of current over one switching period from the parallel power IC circuits.

Upon detection of transient activity by receipt of ATR detection signals, control IC 550 is configured to respond to the transient by causing the phases of all the power IC's to align. For example, if load demand increases causing a high to low voltage step, ATRH transient detection signal is sent to control IC 550 which drives all high-side power switches on after first turning off all low-side power switches. Conversely, if load demand suddenly decreases causing a low to high voltage step, ATRL is sent to control IC 550 which drives all high-side power switches off and then turns on all low-side power switches. By turning all phases on or off simultaneously, a greatly increased rate of charging or discharging of inductor 570 is achieved. In one exemplary embodiment of the present invention, each power IC has a connected inductor 570 which is charged or discharged at an increased rate.

In an exemplary embodiment, an ATRH event starts at time 1450 and ends at time 1451. At the start of the ATRH event, all low-side power switches 1220 are turned off and then, after a short delay, e.g., 20 nanoseconds, all high-side power switches 1210 are turned on causing the previously staggered inductor charging to occur in parallel. See, for example, FIG. 14, reference 1460. At the end of the ATRL event 1451, the inductor charging is returned to its quiescent voltage regulation mode phased switching.

Figure 15:
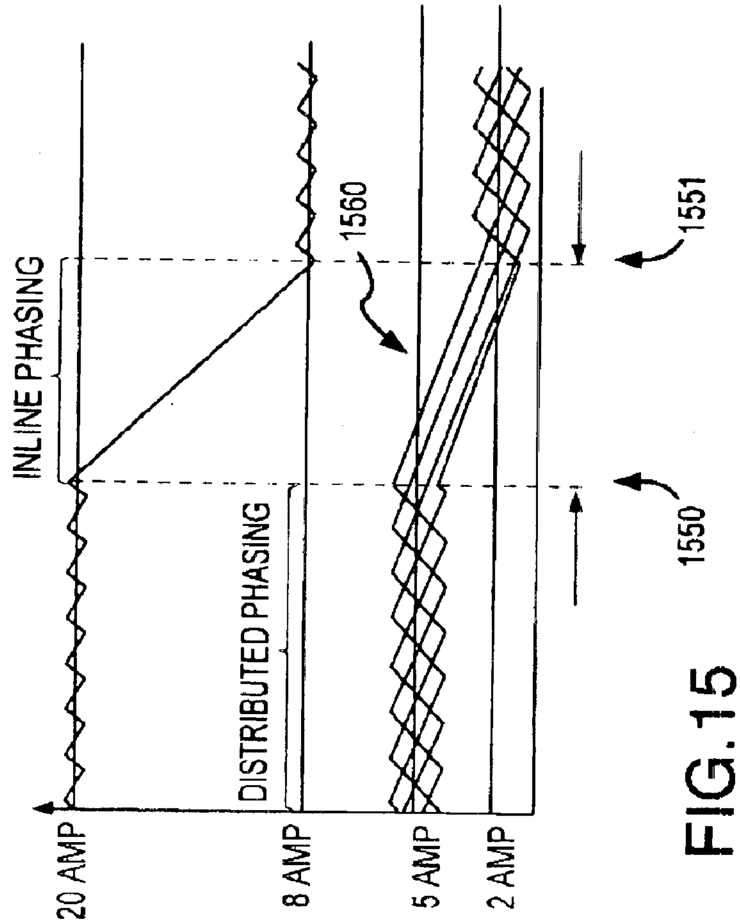
Figure 13:
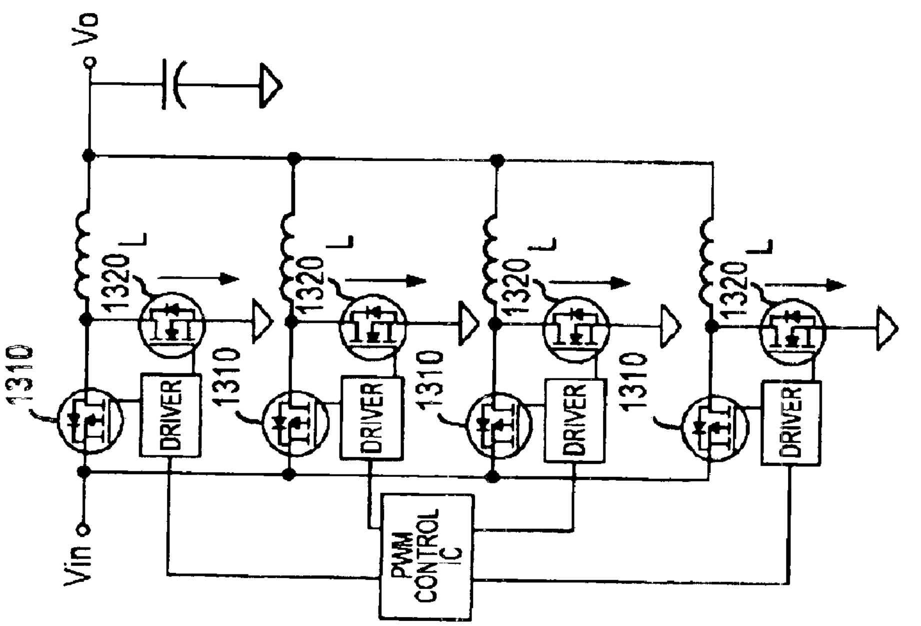

In another exemplary embodiment, and with reference to FIGS. 13 and 15, at the start of the ATRL event 1550, all high-side power switches 1310 are turned off and then, after a short delay, e.g., 20 nanoseconds, all low-side power switches 1320 are turned on causing the previously staggered inductor charging to occur in parallel. See, for example, FIG. 15, reference 1560. At the end of the ATRH event 1551, the inductor charging is returned to its quiescent voltage regulation mode phased switching.

Figure 16:
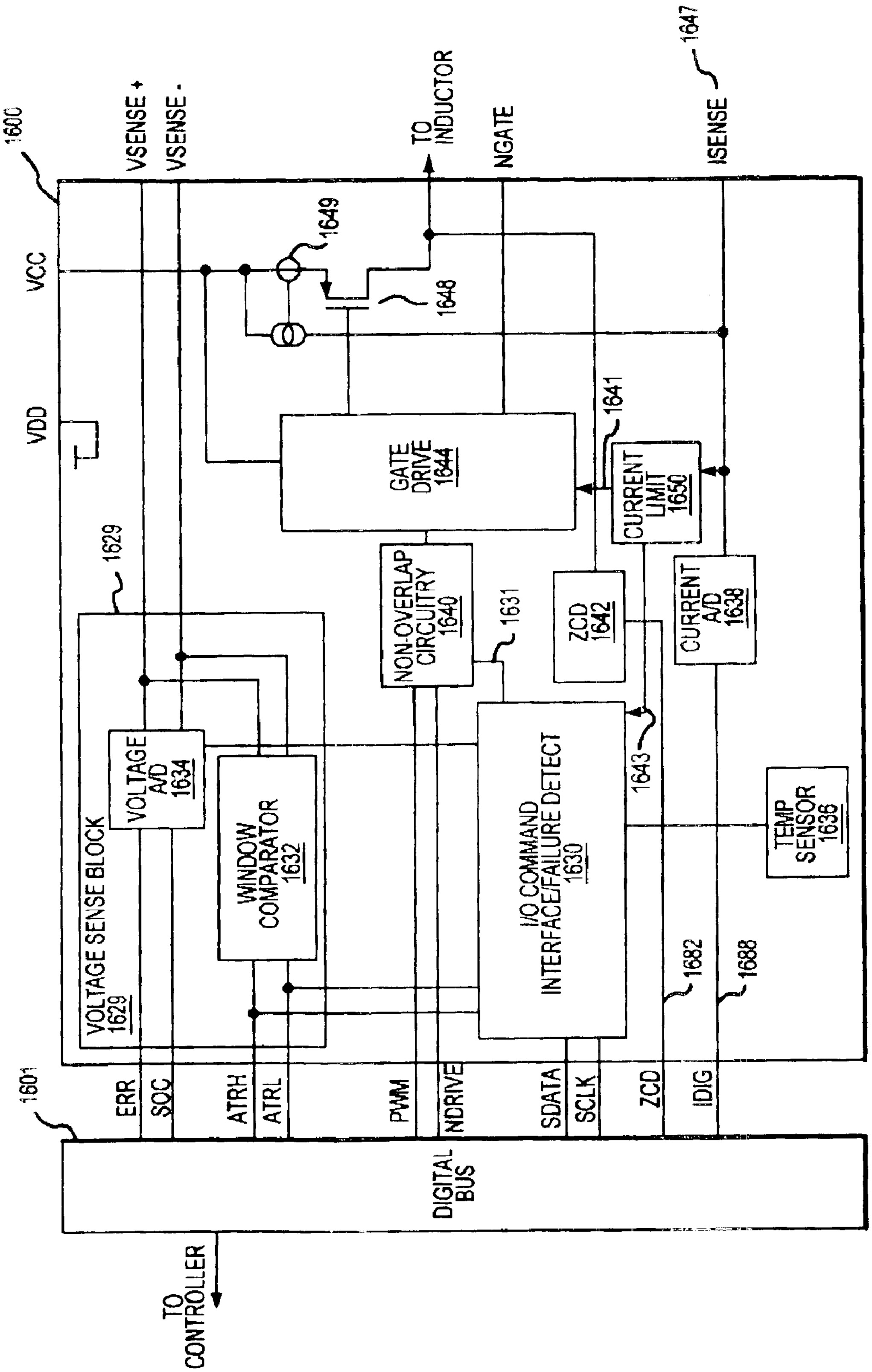
FIG. 16 illustrates, in block format, an exemplary power IC for use in an exemplary embodiment of a power regulation system of the present invention

FIG. 16 illustrates a power IC device 1600, in accordance with an exemplary embodiment of the present invention, which includes an integrated circuit (IC) having multiple pins for facilitating suitable connections to and from the IC. For example, power IC 1600 may include an integrated, P-channel high-side switch 1648 and driver 1644. In various embodiments of the present invention, an N-FET may be external or internal to the power IC. When used in conjunction with external N-FETs and an output inductor (e.g., inductor 570), power IC 1600 forms a buck power stage. Power IC 1600 is optimized for low voltage power conversion (e.g., 12 volts to approximately 1.8 volts and less) which is typically used in VRM (voltage regulator module) applications. The present embodiment of power IC 1600 has particular usefulness in microprocessor power applications. Power IC 1600 includes a voltage sense block 1629, a command interface 1630, a current AND 1638, a non-overlap circuit 1640, a gate drive 1644, a switching element 1648, and a current limiter 1650. Additionally, power IC 1600 may include a current sense 1649, a zero current detector 1642, and/or internal protection features, such as a thermal sensor 1636 and various other features which are discussed below. It will be appreciated that one or more of the sub-components described with reference to FIG. 16 may suitably be omitted and/or substituted with one or more sub-components that perform substantially the same function.

While control IC 550 may be considered the "system controller" which effectively operates and manages each power IC within the system, as well as the system itself, command interface 1630 includes circuitry and the like to function as a "power IC controller." In other words, command interface 1630 may include a portion of the controlling functions of control IC 550 as "on-chip" features.

Command interface 1630 provides a suitable interface for routing signals to and from power IC 1600. For most of the components of power IC 1600, information from the individual component is routed to the control IC through command interface 1630. The information provided to the control IC may include fault detection of a component or system, component or system updates, and any other pertinent information which may be used by the control IC. In accordance with an exemplary embodiment of the present invention, power IC 1600 includes a fault register within command interface 1630 which is polled by the control IC. Command interface 1630 also receives information from the control IC which is distributed to the individual components of power IC 1600 as needed.

For example, each power IC may be set at a predetermined voltage output level as needed for the corresponding load. In addition, the user may set an absolute window for the output voltage. The predetermined set information may then be used by command interface 1630 to send "commands" or set levels to various other components of the power IC. For instance, the predetermined output voltage level (or an equivalent simulation) may be provided from command interface 1630 to voltage sense block 1629 for configuring comparison levels (the functions of voltage sense block and its components will be described in more detail below). Command interface 1630 may also provide information to set "trip points" for current limiter 1650 and optional temperature sensor 1636. Various other system components may also receive commands, information, set levels and so forth, from command interface 1630.

In another exemplary embodiment of the present invention, power IC 1600 is further configured to selectively operate in discontinuous conduction mode. To facilitate this mode of operation, power IC 1600 includes a Zero Current Detect ("ZCD") circuit 1642. During ATR response mode, channel switching occurs at a high frequency. During some portions of the switching process, the inductor current flows away from the load during a short portion of the switching cycle. This high frequency switching results in power loss and in-efficiencies. Furthermore, gate drive 1644 is responsible for large delay in the ATR response of the power IC. This gate delay is due in part to the time spent switching the high-side and low-side power switches. As described above, to avoid short circuit conditions, one of the pair of power switches is first switched off, a short time period passes (e.g., 20 nanoseconds), and then the other power switch is turned on. Non-overlap circuitry 1640 prevents the high and low-side drivers of mode gating logic 1644 from conducting current simultaneously and may include logic gates and/or voltage comparators.

Operation of power IC 1600 in Discontinuous Conduction Mode ("DCM") eliminates the negative current and improves the power efficiency. A ZCD circuit 1642 detects the zero current crossing of the inductor current for each power IC. ZCD circuit 1642 is configured to provide a logic signal over ZCD signal line 1682 to control IC 550. For example, a logic high may be provided to control IC 550 indicating that the zero current crossing has been detected. Control IC 550 can then direct power IC 1600 to turn off the low-side power switch. Advantageously, when a transient ATRH event is detected, DCM mode eliminates the need for the non-overlap time and low-side switch off time because the low-side switch is already off. Therefore, the high-side FET can be switched on without delay, further improving the ATR response time. The detailed operation, structure and function of a suitable zero current detect may be best understood by referencing U.S. patent application Ser. No. 09/978,125, filed on Oct. 15, 2001 and entitled "System And Method For Detection Of Zero Current Condition," the contents of which are incorporated herein by reference.

In some cases, operating in DCM mode may give rise to noise. Therefore, the SPC may be configured to be selectably operable in either Continuous Conduction Mode ("CCM") or DCM mode. Selection of the operating mode may be based, for example, on the loading level of the voltage regulator. In another embodiment, the time delay due to non-overlap may be reduced by disabling the low-side FET for a certain time period, e.g., 50 nanoseconds, after ATRH is initially received. This reduces the delay due to switching between high-side and low-side FETs while the ATRH signal toggles a few times before the signal is regulated. Similarly, the high-side FET may be disabled for a period of time after ATRL is initially received. This reduces the delay due to switching between high-side and low-side FETs while the ATRL signal toggles a few times before the signal is regulated.

In accordance with one aspect of the present invention, the SPC is configured for quick recovery from ATR mode.

In general, ATR techniques, such as those discussed herein, quickly drive the load voltage close to the reference voltage through hysteretic control of the power switches. After the window comparator output turns off, the hysteretic response is discontinued. It may be the case that the difference between the reference voltage and the load voltage is so small that the compensator circuit, in control IC 550, requires a long time to achieve steady state, or perhaps does not achieve steady state condition. Therefore, several exemplary recovery techniques are provided which quickly transition from ATR mode to quiescent voltage regulation mode.

In one exemplary embodiment of the present invention, control IC 550 includes a digital compensator to facilitate rapid recovery to steady state operation. The compensator is a feedback control stage that manipulates the operation of the power switches, e.g., duty cycle, to deliver regulated output voltage, as described earlier. The compensator is configured to control the switch duty ratio and reduce the error between the sensed output voltage and the reference set point. The compensator can also offset the reference point proportionally to the load current level as discussed above with respect to AVP. The compensator may, for example, be a proportional-integral-derivative ("PID") block, although other forms of compensators or controllers may be used.

Although in some embodiments an analog compensator may be used, the use of a digital compensator facilitates the performance of precise offsets which aid in rapidly recovering to the closed loop quiescent mode control. Unfortunately, compensators with good steady state performance tend to have a very slow response time and are often ill suited for rapid load changes. Compensators with good transient response tend to compromise steady state stability. Because the compensator has a unique output level corresponding to each load level, instantaneous offsetting of the compensator quickly places the SPC very close to steady state. Therefore, in exemplary embodiments, a good steady state type compensator is configured for offsetting the compensator output in response to ATR events.

For example, various techniques may be used for offsetting the output of the compensator by a set amount. This can be accomplished instantaneously by use of a digitally implemented PID controller. Furthermore, other variations of a PID controller may digitally offset the compensator output. These digital PID controller offset techniques provide rapid recovery from the transient response mode.

Figure 17:
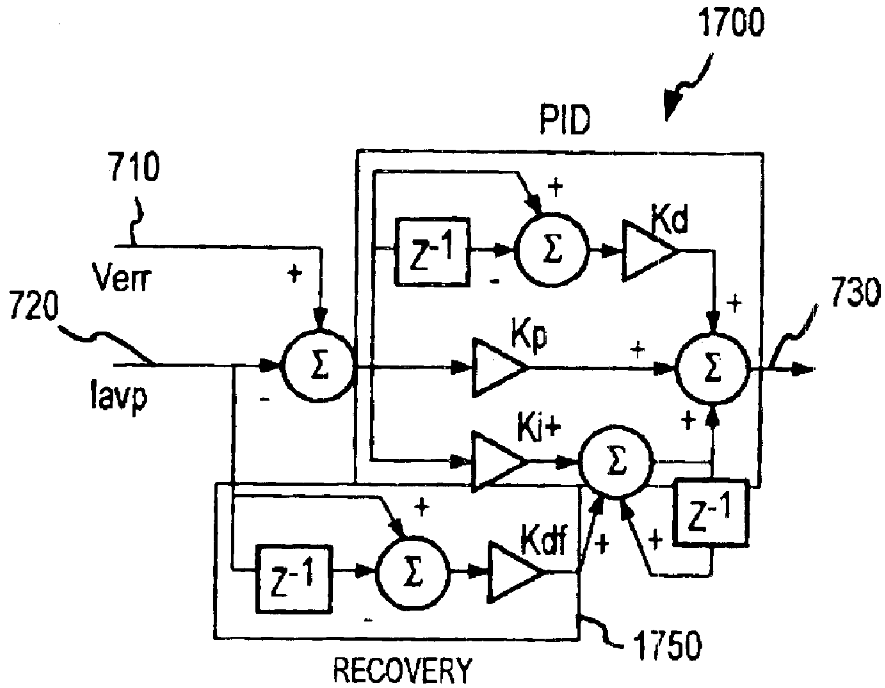
FIGS. 17 and 18 illustrate, in block format, exemplary digital compensators for use in power regulation systems of the present invention.
Figure 18:
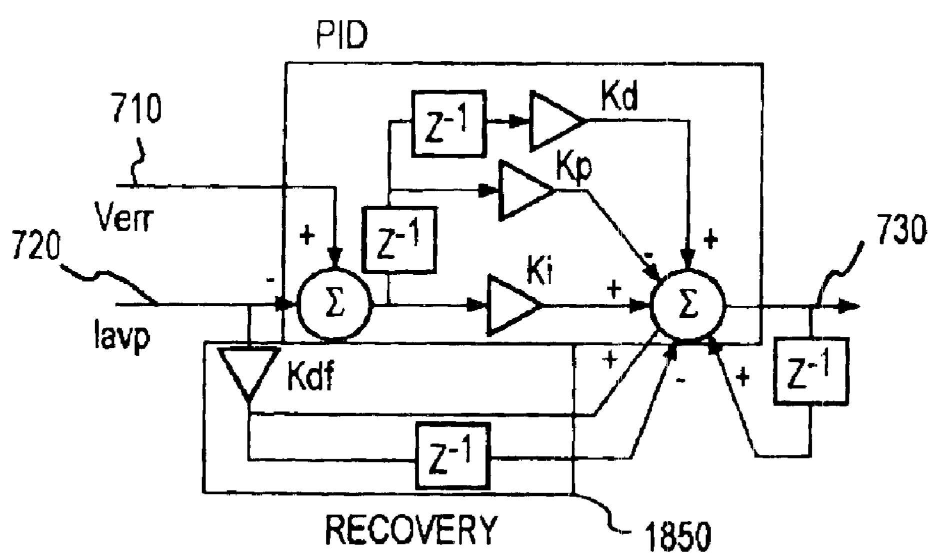

Exemplary PID schematics for this ATR recovery technique are illustrated in FIGS. 17 and 18. PID controller 1700 generally includes the PID controller of FIG. 7, and a recovery path 1750. PID controller 1800 generally includes the PID controller of FIG. 8, and a recovery path 1850. Both PID controllers 1700 and 1800 may receive a voltage error signal on line 710 and an active voltage positioning current on line 720, and may generate a control signal 730. Since the real-time sensed current can be known over the lavp line, the offset gain may be selected to instantly adjust the duty cycle to a value close to its steady value. This technique may result in recovery from a transient, for example, in less than four ATR events. Other forms of compensators that provide an offset to the compensator may also be used with the present invention.

In one exemplary embodiment of the present invention, the output of the compensator is shifted by a fixed amount for each ATR event. The duty cycle is changed by a fixed amount (e.g., 10 nanoseconds) which is added to or subtracted from the integrating element in the compensator with each hysteretic cycle. This technique provides an added "kick" to assist the control IC in generating an output that is closer to the desired settling point, and speeds up recovery. In cases of large load steps, more than one ATR event may be needed before steady state operation is reached. In this embodiment, a fixed amplitude is added to the output of the compensator for an ATRH event, and conversely, a fixed amplitude is subtracted for ATRL events.

In another exemplary embodiment of the present invention, duty cycle offset is again added to, or subtracted from, the compensator output. However, in this embodiment, the offset amount varies in proportion to the length of the ATR event. When a load step occurs, the window comparator output pulse width is measured. In other words, control IC 550 is configured to measure the duration of the ATRL or ATRH signal from the window comparator. A larger load step is associated with a longer ATR. This pulse width is multiplied by a proportionality constant and is added to the current integral sum of the proportional-integral-derivative ("PID") compensator block. This technique generally causes faster recovery than fixed offset amounts because real-time information is used to adjust the size of the offset to the compensator.

In another exemplary embodiment of the present invention, the compensator output is offset by an amount proportional to the pulse density of the window comparator ATR signals. A proportional relationship exists between the size of the load step and the pulse density, i.e., the number of pulses in a given period of time. Control IC 550 is configured to measure the length of the ATR pulses and to provide improved recovery from ATR mode by offsetting the output of the compensator. The offset amount is determined by multiplying the pulse density by a proportionality constant. In some of these offset recovery embodiments, the offset amount may also retrieved from a look-up table.

In yet another exemplary embodiment of the present invention, the compensator output is offset by an amount proportional to the current load step. In this case, each power IC is configured to communicate its peak high-side power switch current to the control IC on a pulse-by-pulse basis. ADC 1638 provides this signal in digital form by receiving the analog signal, Isense 1647, and generating IDIG which is communicated to the control IC 550 over IDIG signal lines 1688. Control IC 550 is configured to receive information on the total load current being supported by the SPC. This current signal may also be used to generate the lavp signal for the digital compensator. When a load transient occurs, control IC 550 compares the old total load current with the new total load current. The integral sum of the compensator is then offset by an amount proportional to the size of the current load step.

Figure 19:
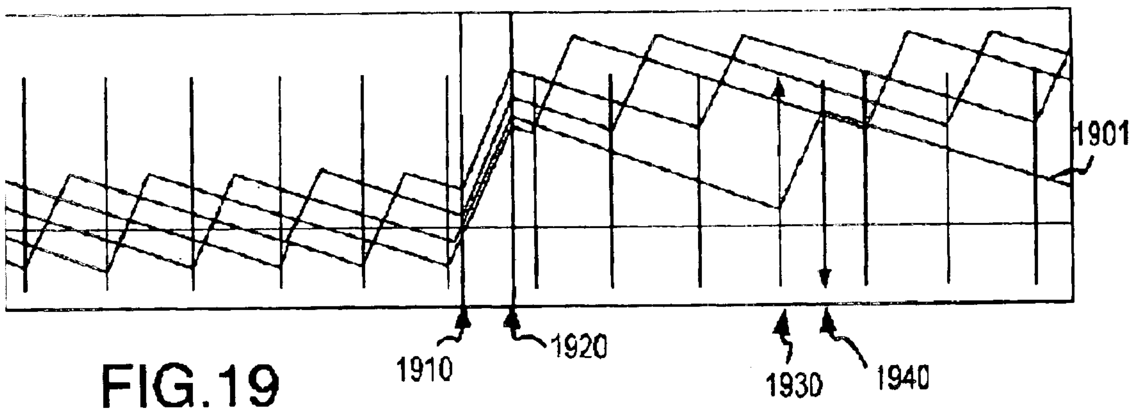
FIGS. 19–21 illustrate, exemplary active transient response output current phase diagrams in an exemplary power regulation system of the present invention.

As discussed above, one technique for rapid response to transient events is to synchronize the turn on or turn off switching of all the power switches causing each phase of a multiphase regulator to act in unison. This produces periods of high di/dt and rapid slewing of current to react to the load step. With reference to FIG. 19, phased switching occurs prior to the start 1910 of an ATRH event, at which point all high-side power switches are synchronized and turned on until the end 1920 of the ATRH event. At the end of the ATRH event, for example, all switches may be phased back in their pre-ATRH event state. Using the same switching pattern that was used prior to the ATRH event, it is possible that one or more current phases may not be re-phased at the appropriate level. For example, phase 1901 is left off after the end of the ATRH event 1920 until point 1930. At point 1930, phase 1901 is switched on and then switched off again in its regular pattern at 1940. This sequence results in phase 1901 operating at a lower average than the other three phases and impedes proper recovery.

Figure 20:
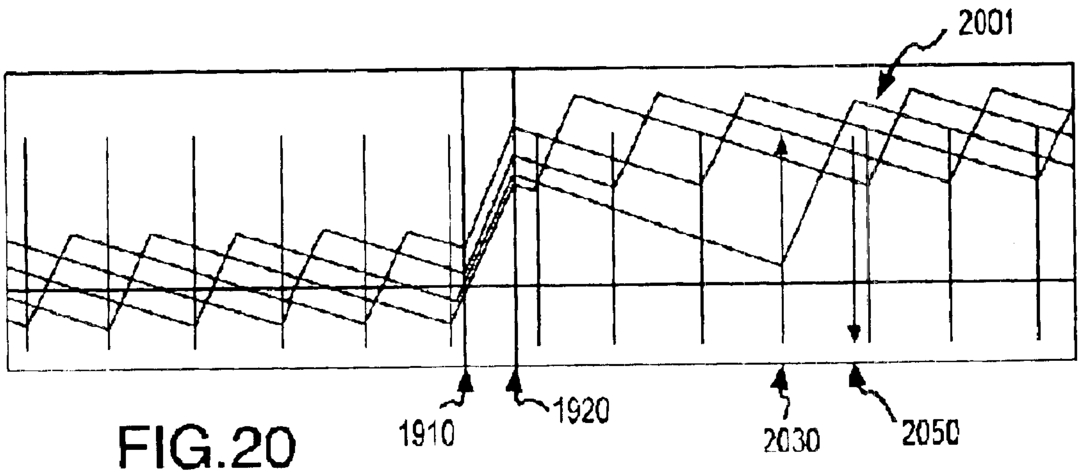

In one exemplary embodiment of the present invention, each power switch is switched in sequence and in step with the pre-ATRH switching clock. However, for each phase, the current is allowed to climb to the appropriate level for current balance. With reference to FIG. 20, for example, phase 2001 is again switched on at point 2030, but the switch off is delayed until point 2050 when the current has reached the appropriate peak value for the new microprocessor load. In this manner, the four current phases can be re-phased within two switching cycles.

Figure 21:
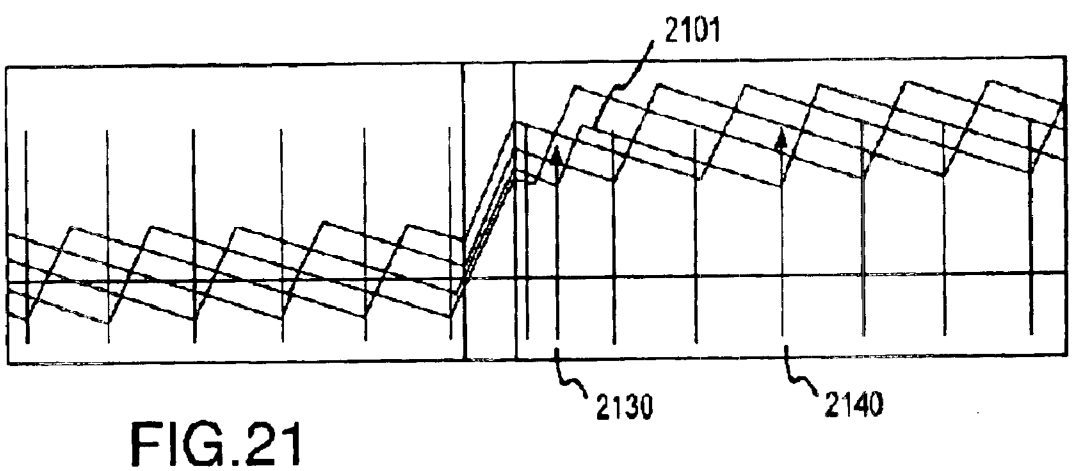

In another embodiment, after the ATR event, asynchronous turn on and turn off of the power switches is utilized to more quickly re-phase the four current channels at the new load level. Phases that would otherwise be out of alignment are selectively switched on or off to pull the phases into alignment. With reference to FIG. 21, asynchronous turn on is selectively used at time 2130 and 2140, on a single channel 2101, to "ramp" the current of that channel up to the proper level to achieve current balance.

Both current balancing techniques may be implemented where a control IC 550 is configured to measure and store peak current values for each phase in a given cycle. In one embodiment the slope of the current slew rate is calculated by assuming the inductors are matched.

In an exemplary embodiment of the present invention, the voltage regulation device 600 is further configured with safety devices. For example, power IC 1600 may be configured with safety devices, such as: current limit circuits, excessive ATR limit circuits, thermo-limit circuits, and other fault detection circuits. In accordance with one exemplary embodiment of the present invention, a power IC circuit 1600 is configured with current limiting circuitry. The current limiting circuitry is provided to prevent one or more of the power IC devices from generating excessive (e.g., greater than about 30 Amps) peak current. During quiescent voltage regulation mode operation, in one exemplary embodiment of the present invention, the switching of the multiple power IC devices is staggered over one switching cycle to generate power IC output current signals that are equally separated in phase with each other. Each power IC 550 may have a different output current from the other power IC devices at any moment in time. When an ATR event occurs, in an exemplary response, all of the power IC's operate together to increase/decrease the combined current output for higher/lower voltage steps, respectively. For example, during ATRH, all power IC high-side switches are turned on, and high-side switches that were already on just before ATRH are caused to remain on. Therefore, if a power IC has been on for a period of time before the ATR event starts, and remains on during the ATR event a sufficiently long period of time, that power IC output may charge its output inductor much higher than other power IC channels and result in severe current imbalance. Furthermore, if that power IC's inductor reaches its saturation current, the power IC may fail due to current and thermal runaway.

With reference now to FIG. 16, an exemplary power IC circuit 1600 is configured to receive a signal from a current sensing circuit via Isense signal line 1647. The current sensing circuit may be configured in a variety of ways to provide a signal representative of the current flowing from the high-side transistor switch. Identifying the current from the high-side transistor switch may be advantageous for, among other things, providing additional fault protection, and monitoring the power regulation. An exemplary current sensing system may be better understood by referencing U.S. patent application Ser. No. 09/978,296, filed on Oct. 15, 2001 and entitled "System and Method for Current Sensing." The contents of which are incorporated herein by reference.

Power IC 1600 is configured to turn off the power IC when the high-side current is greater than a threshold current. For example, the current limiting circuitry senses the high-side current of each power IC and the sensed high-side current is compared to a threshold current. The results of the comparison may be passed to command interface 1630. In one example, the current limiter 1650 receives a small fraction of the current to the load. If the current is less than the threshold current, the current limiting circuitry continues to monitor the current. If the sensed current is greater than the threshold current, power IC 1600 is turned off for the remainder of the switching period. Thus, the circuit is protected from the damage that may result from over currents. The current limit method and device are further described in U.S. patent application Ser. No. 09/975,195, System and Method for Highly Phased Power Regulation, incorporated by reference. Other logic and circuit configurations may also be used to accomplish the current limit protection in accordance with the present invention.

FIG. 16 illustrates an exemplary failure detection block 1630 which is configured to prevent damage to the voltage regulator due to an excessive ATR event rate. High transient load current activity gives rise to a high ATR event rate, which may cause high temperatures within the power IC due to high frequency power dissipation. In extreme cases, for example, cases involving large load step sizes and high frequency ATR events, or in other situations where the power IC operates in hysteretic mode for a long period of time, the system could overheat and fail. Therefore, excessive event rate protection is provided by counting the number of ATR events per time interval, comparing this ATR event rate to an ATR event rate threshold, and shutting down the high-side and low-side switches in all the power stages of the system if the ATR event rate exceeds the ATR event rate threshold (e.g., 1000 events/micro-second).

Failure detection block 1630 is configured to count the number of ATR events per time interval. For example, failure detection block 1630 is configured to receive ATRH and ATRL signals from voltage sense block 1629, to count the number of ATRH and ATRL signals received over a period of time, and to generate a signal representative of the ATR event rate. A comparator within failure detection block 1630 compares the ATR event rate with an ATR event rate threshold and generates a logic output signal on line 1631. For example, an ATR event rate threshold may be 100 per 50 micro seconds, 100 micro seconds or another suitable period of time. Logic output signal line 1631 is configured to communicate an override signal which turns off high-side circuit 1648 in a manner similar to that described with regard to current limit device 1650. In one example, all limiting logic signals are combined with logical AND operations to drive a single override circuit. Furthermore, in other exemplary embodiments, excessive ATR event rate limiting and monitoring can occur in the control IC, or in both the control IC and power IC.

In accordance with other embodiments of the present invention, a method for protecting the voltage regulation module from excessive temperature levels is provided by sensing the temperature of the power IC circuitry, comparing the sensed temperature to a temperature threshold, and performing a system shutdown if the sensed temperature exceeds the temperature threshold. For example, the temperature threshold may be 145° C. to 205° C. or another desired set point. In an exemplary embodiment of the present invention, a temperature sensor 1636 is configured to sense the temperature of power IC 550 circuitry and to provide a signal representative of the power IC circuitry temperature to failure detect block 1630. Failure detect block 1630 includes a comparator for comparing the power IC temperature signal to a power IC threshold temperature and generates a logic output signal. For example, the temperature logic output signal may be provided to the control IC via the I/O command block 1630. The Control IC then turns off the high-side circuit 1648 and the low-side FET. In one example, all limiting signals are combined with logical AND operations to form a single logical output limiting signal on line 1631 to drive a single override circuit. Temperature sensor 1636 may be, but is not limited to, an integrated solid state current modulating sensor or a thermistor.

It should be appreciated that the particular implementations shown and described herein are illustrative of various embodiments of the invention including its best mode, and are not intended to limit the scope of the present invention in any way. Indeed, for the sake of brevity, conventional techniques for signal processing, data transmission, signaling, and network control, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

The present invention has been described above with reference to exemplary embodiments. However, those skilled in the art having read this disclosure will recognize that changes and modifications may be made to the embodiments without departing from the scope of the present invention. For instance, the present invention has been described with a single control IC to manage/control the power regulation to one or more loads; it should be recognized, however, that more than one control IC may used to manage/control multiple loads within the system depending upon the particular requirements and limitations of the system. These and other changes or modifications are intended to be included within the scope of the present invention, as expressed in the following claims.

What is claimed is:

1. An active transient response ("ATR") device for providing regulated voltage to a variable load during steady state and transient load periods, the ATR device comprising:

a control IC configured to receive an early transient event detection signal, to receive a transient event detection signal, to control at least one power IC during quiescent voltage regulation, and to control at least one power IC during a transient response mode; wherein the transient mode response is initiated upon receipt of the early transient event detection signal;

a power IC configured to detect the transient event, to provide the transient event detection signal to the control IC, and to provide a regulated voltage level to a load as driven by the control IC; and a transient suppressor IC configured to detect the transient event, to provide an early transient event detection signal to the control IC, and configured to directly respond to the transient event by sourcing current to the load when the load increases and sinking current from the load to a ground when the load decreases.

2. The ATR device of claim 1, wherein the transient suppressor is packaged with the variable load.

3. The ATR device of claim 1, wherein the power IC comprises a window comparator configured to detect the transient event.

4. The ATR device of claim 3, wherein the window comparator is configured to send a second signal to the control IC when a sensed load voltage is higher than a reference voltage, and to send a first signal to the control IC when the sensed load voltage is lower than the reference voltage.

5. The ATR device of claim 4, wherein the window comparator is configured with a direct current reference voltage.

6. The ATR device of claim 1, wherein the transient suppressor comprises a window comparator configured to detect the transient event.

7. The ATR device of claim 4, wherein the window comparator is configured to send an fourth signal to the control IC when a sensed load voltage is higher than a reference voltage, and to send a third signal to the control IC when the sensed load voltage is lower than the reference voltage, and wherein the fourth and third signals comprise the early transient event detection signal.

8. The ATR device of claim 7 wherein the window comparator is configured with an alternating current reference voltage.

9. The ATR device of claim 1 wherein the control IC comprises a digital compensator configured to modify the duty cycle for a high-side and low-side power switch of the power IC to regulate voltage levels, and wherein the digital compensator is configured as a PID).

10. The ATR device of claim 1 wherein the control IC comprises a gating logic section configured in communication with the transient suppressor IC and the power IC, wherein the gating logic section is configured to generate a unified transient event detection signal comprising the early transient event detection signal from the transient suppressor until the transient event detection signal from the power IC is received.

11. The ATR device of claim 1 wherein the control IC is further configured to align at least two power IC output phases to increase the ATR device slew rate.

12. The ATR device of claim 1 wherein the variable load is a microprocessor.

13. The ATR device of claim 1 wherein the control IC is further configured to provide protection to one or more power IC devices from over current damage.

14. The ATR device of claim 13 wherein the power IC is further configured with a thermal detection circuit for protecting the power IC device from over temperature damage.

15. The ATR device of claim 13 wherein the power IC is further configured with a current limiter circuit for protecting the power IC device from over current damage.

16. The ATR device of claim 13 wherein the ATR device is further configured to determine an ATR event rate, compare the ATR event rate to an ATR event rate threshold and shut down the ATR device if the ATR event rate is greater than ATR event rate threshold.

17. The ATR device of claim 1 wherein the control IC is further configured to selectively operate in discontinuous conduction mode and continuous conduction mode.

18. The ATR device of claim 1 wherein the power IC further comprises a zero current detect circuit for facilitating discontinuous conduction mode.

19. The ATR device of claim 9, wherein the control IC is configured to recover from the transient response mode.

20. The ATR device of claim 19 wherein the control IC is further configured to offset the output of the digital compensator by a fixed amount for each ATR event for actively positioning the digital compensator output at a second steady state load.

21. The ATR device of claim 19 wherein the control IC is further configured to offset the output of the digital compensator by an amount proportional to an ATR event duration for actively positioning the digital compensator output at a second steady state load.

22. The ATR device of claim 19 wherein the control IC is further configured to offset the output of the digital compensator by an amount proportional to the density of the ATR event for actively positioning the digital compensator output at a second steady state load.

23. The ATR device of claim 19 wherein the control IC is further configured to offset the output of the digital compensator by an amount proportional to a sensed load current for actively positioning the digital compensator output at the second steady state load.

24. The ATR device of claim 19 wherein the control IC is further configured to rephase the power IC output currents to provide rapid recovery from the active transient response mode.

25. The ATR device of claim 24 wherein the rephasing is performed by delaying the switching of at least one phase.

26. The ATR device of claim 24 wherein the rephasing is performed by switching at least one phase asynchronously to the power stage clock.

27. A method for regulating voltage to a variable load, the method comprising the steps of:

regulating voltage at a first steady state load;

detecting a transient event with a power IC device and a transient suppressor IC device;

providing an early transient detection signal from the transient suppressor to a control IC;

responding to the transient event, wherein the transient response is driven by the control IC; and recovering to a second steady state load.

28. The method of claim 27 further comprising the step of protecting the power IC from over current and failure.

29. The method of claim 27 further comprising the step of transitioning control of the transient response from the transient suppressor early transient detection signal to the power IC transient detection signal.

30. The method of claim 27 further comprising the step of suppressing the transient, wherein the suppressing step comprises the step of sourcing current to the load when the load increases and sinking current from the load to ground when the load decreases, and wherein the sourcing and sinking is performed by the transient suppressor.

31. The method of claim 27 wherein the responding step further comprises the step of aligning at least two or more power IC phases to rapidly slew current.

32. The method of claim 27 wherein the responding step further comprises the step of selectively operating in discontinuous conduction mode and continuous conduction mode.

33. The method of claim 27 wherein the responding step further comprises the step of operating in zero current detect mode to reduce time delays in responding to transient events.

34. The method of claim 27 wherein the recovering step further comprises the step of offsetting the output of a compensator by a fixed amount for each ATR event for actively positioning a compensator output at the second steady state load.

35. The method of claim 27 wherein the recovering step further comprises the step of offsetting the output of a compensator by an amount proportional to the duration of the ATR event for actively positioning a compensator output at the second steady state load.

36. The method of claim 27 wherein the recovering step further comprises the step of offsetting the output of a compensator by an amount proportional to the density of the ATR event for actively positioning a compensator output at the second steady state load.

37. The method of claim 27 wherein the recovering step further comprises the step of offsetting the output of a compensator by an amount proportional to a sensed load current for actively positioning a compensator output at the second steady state load.

38. The method of claim 27 wherein the recovering step further comprises the step of current rephasing.

39. A method of using the device of claim 1 comprising the steps of regulating voltage at a first steady state load;

detecting a transient event with a power IC device and a transient suppressor IC device;

providing an early transient detection signal from the transient suppressor to a control IC;

responding to the transient event, wherein the transient response is driven by the control IC; and recovering to a second steady state load.

40. A power regulation system coupled to an input source voltage (Vin) and an output voltage (Vout) coupled to a load, the system comprising:

a power supply configured to receive an early transient event detection signal, to receive a transient event detection signal, to control at least one power IC during a quiescent voltage regulation mode, and to control at least one power IC during a transient response mode; wherein the transient mode response is initiated upon receipt of the early transient event detection signal;

a power IC configured to detect the transient event, to provide the transient event detection signal to the control IC, and to provide a regulated voltage level to a load as driven by the control IC; and a transient suppressor IC configured to detect the transient event, to provide an early transient event detection signal to the control IC, and configured to directly respond to the transient event by sourcing current to the load when the load increases and sinking current from the load to a ground when the load decreases.

41. The power regulation system of claim 40, further comprising a mode of operation.

42. The power regulation system of claim 41, wherein said mode of operation includes one of pulse width modulation, constant ON time variable frequency, constant ON or OFF time and variable frequency, simultaneous phases ON, simultaneous phases OFF, active transient response high, active transient response low, continuous conduction and discontinuous conduction.

43. An active transient response ("ATR") device for voltage regulation to a variable load during steady state and transient load periods, the ATR device comprising:

a power supply configured to provide quiescent voltage regulation to a variable load, the power supply further configured to receive a transient event detection signal for initiating an active transient response mode voltage regulation, the power supply further configured to provide recovery from the active transient response mode;

wherein the power supply further comprises a transient suppressor IC configured to detect the transient event and to provide an early transient event detection signal to the control IC.

44. An active transient response ("ATR") device for voltage regulation to a variable load during steady state and transient load periods, the ATR device comprising:

a power supply configured to provide quiescent voltage regulation to a variable load, the power supply further configured to receive a transient event detection signal for initiating an active transient response mode voltage regulation, the power supply further configured to provide recovery from the active transient response mode;

wherein the power supply further comprises a transient suppressor IC configured to detect the transient event and to directly respond to the transient event by sourcing current to the load when the load increases and sinking current from the load to a ground when the load decreases.

45. An active transient resoonse ("ATR") device for voltage regulation to a variable load during steady state and transient load periods, the ATR device comprising:

a power supply configured to provide quiescent voltage regulation to a variable load, the power supply further configured to receive a transient event detection signal for initiating an active transient response mode voltage regulation, the power supply further configured to provide recovery from the active transient response mode;

wherein the power supply further comprises:

a control IC configured receive the transient event detection signal, to initiate and drive the active transient response mode, and to drive recovery from the active transient response mode;

a power IC configured to detect the transient event, to provide the transient event detection signal to the control IC, and to provide a regulated voltage level to a load as driven by the control IC;

a transient suppressor IC configured to detect the transient event, to directly respond to the transient event by sourcing current to the load when the load increases and sinking current from the load to a ground when the load decreases, and to provide an early transient event detection signal to the control IC, wherein the transient event detection signal comprises an early transient event detection signal.

46. The ATR device of claim 45, wherein the transient suppressor is located in close proximity to the microprocessor.

47. The ATR device of claim 45, wherein the power IC comprises a window comparator configured to detect the transient event.

48. The ATR device of claim 45, wherein the transient suppressor comprises a window comparator configured to detect the transient event.

49. The ATR device of claim 45, wherein the window comparator is configured to send a second signal to the control IC when a sensed load voltage is higher than a reference voltage, and to send a first signal to the control IC when the sensed load voltage is lower than the reference voltage.

50. The ATR device of claim 49, wherein the window comparator is configured with a direct current reference voltage.

51. The ATR device of claim 48, wherein the window comparator is configured to send a fourth signal to the control IC when a sensed load voltage is higher than a reference voltage, and to send a third signal to the control IC when the sensed load voltage is lower than the reference voltage, and wherein the fourth and third signals comprise the early transient event detection signal.

52. The ATR device of claim 51 wherein the window comparator is configured with an alternating current reference voltage.

53. The ATR device of claim 45, wherein the control IC comprises a digital compensator configured to modify the duty cycle for a high-side and low-side power switch of the power IC to regulate voltage levels, and wherein the digital compensator is configured as a PID.

54. The ATR device of claim 45, wherein the control IC comprises a gating logic section configured in communication with the transient suppressor IC and the power IC, wherein the gating logic section is configured to generate a unified transient event detection signal comprising the early transient event detection signal from the transient suppressor until the transient event detection signal from the power IC is received.

55. The ATR device of claim 45, wherein the control IC is further configured to align at least two power IC output phases to increase the ATR device slew rate.

56. The ATR device of claim 45, wherein the load is a microprocessor.

57. The ATR device of claim 45, wherein the control IC is further configured to provide protection to one or more power IC devices from over current damage.

58. The ATR device of claim 57, wherein the power IC is further configured with a thermal detection circuit for protecting the power IC device from over current damage.

59. The ATR device of claim 57, wherein the power IC is further configured with a current limiter circuit for protecting the power IC device from over current damage.

60. The ATR device of claim 57, wherein the ATR device is further configured to determine an ATR event rate, compare the ATR event rate to an ATR event rate threshold and shut down the ATR device if the ATR event rate is greater than ATR event rate threshold.

61. The ATR device of claim 45, wherein the control IC is further configured to selectively operate in discontinuous conduction mode and continuous conduction mode for faster transient response.

62. The ATR device of claim 45, wherein the power IC further comprises a zero current detect circuit for facilitating discontinuous conduction mode.

63. The ATR device of claim 53, wherein the control IC is configured to recover from the transient response mode.

64. The ATR device of claim 63, wherein the control IC is further configured to offset the output of the digital compensator by a fixed amount for each ATR event for actively positioning the digital compensator output at a second steady state load.

65. The ATR device of claim 63, wherein the control IC is further configured to offset the output of the digital compensator by an amount proportional to an ATR event duration for actively positioning the digital compensator output at a second steady state load.

66. The ATR device of claim 63, wherein the control IC is further configured to offset the output of the digital compensator by an amount proportional to the density of the ATR event for actively positioning the digital compensator output at a second steady state load.

67. The ATR device of claim 63, wherein the control IC is further configured to offset the output of the digital compensator by an amount proportional to a sensed load current for actively positioning the digital compensator output at the second steady state load.

68. The ATR device of claim 63, wherein the control IC is further configured to rephase the power IC output currents to provide rapid recovery from the active transient response mode.

69. The ATR device of claim 68, wherein the rephasing is performed by delaying the switching of at least one phase.

70. The ATR device of claim 68, wherein the rephasing is performed by asynchronously switching at least one phase.

* * * * *